US00RE50160E

(19) United States
(12) Reissued Patent
Park et al.

(10) Patent Number: US RE50,160 E
(45) Date of Reissued Patent: Oct. 1, 2024

(54) WIRELESS POWER RECEIVER

(71) Applicant: SAMSUNG ELECTRONICS CO., LTD., Suwon-si (KR)

(72) Inventors: Sung-Bum Park, Suwon-si (KR); Do-Won Kim, Suwon-si (KR); Young-Ho Ryu, Yongin-si (KR); Dong-Zo Kim, Yongin-si (KR); Jae-Hyun Park, Yongin-si (KR); Keum-Su Song, Seoul (KR); Sung-Ku Yeo, Daejeon (KR)

(73) Assignee: SAMSUNG ELECTRONICS CO., LTD., Suwon-si (KR)

(21) Appl. No.: 17/016,018

(22) Filed: Sep. 9, 2020

Related U.S. Patent Documents

Reissue of:
(64) Patent No.: 10,075,018
Issued: Sep. 11, 2018
Appl. No.: 14/965,421
Filed: Dec. 10, 2015

(30) Foreign Application Priority Data

Dec. 10, 2014 (KR) ..... 10-2014-0177623
Dec. 9, 2015 (KR) ..... 10-2015-0175119

(51) Int. Cl.
*H02J 5/00* (2016.01)
*H02J 50/10* (2016.01)
(Continued)

(52) U.S. Cl.
CPC ..... *H02J 50/10* (2016.02); *H02J 50/12* (2016.02); *H02J 50/402* (2020.01)

(58) Field of Classification Search
CPC ..... H02J 50/10; H02J 50/12; H02J 50/40
See application file for complete search history.

(56) References Cited

U.S. PATENT DOCUMENTS

2007/0222542 A1 9/2007 Joannopoulos et al.
2012/0262003 A1 10/2012 Tetu
(Continued)

FOREIGN PATENT DOCUMENTS

EP 2 752 958 7/2014
EP 2752958 A2 7/2014
(Continued)

OTHER PUBLICATIONS

Examination Report issued Nov. 26, 2020 in counterpart Indian Patent Application No. 201717023518 and English-language translation.

*Primary Examiner* — Linh M Nguyen
(74) *Attorney, Agent, or Firm* — Nixon & Vanderhye, P.C.

(57) ABSTRACT

A wireless power receiver is disclosed. A wireless power receiver according to various embodiments of the present disclosure includes a resonant reception unit configured to receive wireless power by a resonance scheme; an inductive reception unit configured to receive wireless power by an induction scheme; and a power processing unit configured to process wireless power received at the resonant reception unit and the inductive reception unit. When the wireless power is received by the induction scheme, a current flowing in the inductive reception unit is greater than a current flowing in the resonant reception unit, and when the wireless power is received by the resonance scheme, a current flowing in the resonant reception unit is greater than a current flowing in the inductive reception unit.

14 Claims, 13 Drawing Sheets

(51) Int. Cl.
*H02J 50/12* (2016.01)
*H02J 50/40* (2016.01)

(56) References Cited

U.S. PATENT DOCUMENTS

| | | | | |
|---|---|---|---|---|
| 2013/0057079 | A1 | 3/2013 | Park et al. | |
| 2013/0076306 | A1 | 3/2013 | Lee et al. | |
| 2013/0147281 | A1* | 6/2013 | Kamata | H02J 17/00 307/104 |
| 2014/0028111 | A1 | 1/2014 | Hansen et al. | |
| 2014/0049118 | A1 | 2/2014 | Karalis et al. | |
| 2014/0139180 | A1 | 5/2014 | Kim et al. | |
| 2014/0159656 | A1 | 6/2014 | Riehl | |
| 2014/0239732 | A1 | 8/2014 | Mach et al. | |
| 2015/0333530 | A1* | 11/2015 | Moyer | H02J 5/00 307/104 |

FOREIGN PATENT DOCUMENTS

| | | | |
|---|---|---|---|
| KR | 20140031709 | * | 3/2014 |
| WO | WO-2012111873 | * | 8/2012 |
| WO | 2013/141658 | | 9/2013 |
| WO | 2013-141658 A1 | | 9/2013 |

* cited by examiner

WIRELESS POWER RECEIVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION(S)

This application claims the benefit under 35 U.S.C. § 119(a) of a Korean patent application filed in the Korean Intellectual Property Office on Dec. 10, 2014 and assigned Serial No. 10-2014-0177623 and a Korean patent application filed in the Korean Intellectual Property Office on Dec. 9, 2015 and assigned Serial No. 10-2015-0175119, the entire disclosure of which is incorporated herein by reference.

BACKGROUND

The present disclosure relates to a wireless power receiver, and more particularly, to a wireless power receiver for wirelessly receiving power from a wireless power transmitter.

A mobile terminal such as a mobile phone or a personal digital assistant (PDA) is generally powered by a rechargeable battery. In order to charge such a rechargeable battery, electrical energy is supplied to the rechargeable battery via a separate charging device. Typically, the charging device is electrically connected to the rechargeable battery via contact terminals formed on the charging device and the rechargeable battery.

However, in contact-type charging scheme, the contact terminals may be contaminated by foreign substances, causing unstable battery charging. Further, battery charging may not be performed correctly if the contact terminals are exposed to the moisture.

Thus, non-contact or wireless charging technology has been recently developed and used for many electronic devices.

For example, wireless power transmission/reception-based systems may use wireless charging technology for wireless charging. An exemplary wireless power transmission/reception-based system may be a mobile phone whose battery may be wirelessly charged when a user places the mobile phone on a charging pad, instead of connecting an external charging connector to the mobile phone. Wireless electric toothbrushes or cordless electric shavers are also generally known as wireless charging technology-based devices. Generally, wireless charging technology may improve the waterproof capability of an electronic device because the electronic device may be wirelessly charged with minimum or no exposure of its components. Wireless charging technology may also improve the portability of an electronic device when wired charging becomes optional. Wireless charging technology may also evolve significantly in the coming electric car era.

Wireless charging technology may be roughly classified into an electromagnetic induction power transmission scheme based on coils, a resonance power transmission scheme based on resonance, and a radio wave radiation (or radio frequency (RF)/microwave radiation) power transmission scheme that converts electrical energy into microwaves.

Electromagnetic induction-based power transmission scheme is generally based on transmitting power between a primary coil and a secondary coil. If a magnet is moved around a coil, a current may be induced. Based on this principle, if a magnetic field is generated at a transmitter, a current may be induced due to a change in the magnetic field at a receiver, producing the energy. This phenomenon is called magnetic induction, and a magnetic induction-based power transmission scheme is efficient in energy transmission.

As for the resonance power transmission scheme, Professor Soljacic and a research team at Massachusetts Institute of Technology (MIT) announced in 2005 a wireless charging system in which power is wirelessly transmitted to an electronic device even though the electronic device is a few meters away from a charging device, by using resonant power transmission principle as coupled mode theory. The wireless charging system proposed by the MIT team uses resonance, in which, for example, if a tuning fork rings, a nearby wineglass also rings at the same frequency. The research team generates electromagnetic waves containing electrical energy resonating at a resonant frequency, instead of resonating sounds. The resonated electrical energy is directly transmitted when an electronic device having a resonant frequency is nearby. The unused electrical energy is re-absorbed as an electromagnetic field. Unlike other electromagnetic waves, the resonated electrical energy does not seem to affect machines or humans nearby.

The electromagnetic induction-based power transmission/reception scheme may be different from the resonance-based power transmission/reception scheme. For example, the electromagnetic induction-based power transmission/reception scheme and the resonance-based power transmission/reception scheme may be different in terms of their wireless power transmission/reception frequencies, and in terms of values of respective circuit elements. For example, a wireless power receiver designed for the resonance-based power transmission/reception scheme may not receive wireless power where an induction scheme-based wireless power transmitter is disposed. Conversely, a wireless power receiver designed for the induction scheme may not receive wireless power where a resonance scheme-based wireless power transmitter is disposed.

The above information is presented as background information only to assist with an understanding of the present disclosure. No determination has been made, and no assertion is made, as to whether any of the above might be applicable as prior art with regard to the present disclosure.

SUMMARY

An aspect of various embodiments of the present disclosure is to provide a wireless power receiver for solving the above-mentioned problems and/or other problems.

In accordance with an aspect of the present disclosure, there is provided a wireless power receiver configured to receive wireless power. The wireless power receiver includes a resonant reception unit configured to receive wireless power by a resonance scheme; an inductive reception unit configured to receive wireless power by an induction scheme; and a power processing unit configured to process wireless power received at the resonant reception unit and the inductive reception unit. When wireless power is received by the induction scheme, a current flowing in the inductive reception unit is greater than a current flowing in the resonant reception unit, and when wireless power is received by the resonance scheme, a current flowing in the resonant reception unit is greater than a current flowing in the inductive reception unit.

In accordance with another aspect of the present disclosure, there is provided a wireless power receiver for receiving wireless power. The wireless power receiver includes a resonant circuit configured to receive wireless power by a resonance scheme; a coil configured to receive wireless power by an induction scheme; and a power processing unit configured to process wireless power received through the resonant circuit and the coil. When wireless power is received by the induction scheme, a current flowing in the coil is greater than a current flowing in the resonant circuit, and when wireless power is received by the resonance scheme, a current flowing in the resonant circuit is greater than a current flowing in the coil.

In accordance with another aspect of the present disclosure, there is provided a wireless power receiver that includes a power reception unit configured to receive wireless power of a first frequency by an induction scheme, and receive wireless power of a second frequency by a resonance scheme; and a power processing unit configured to process the wireless power of the first frequency and the wireless power of the second frequency.

In accordance with further another aspect of the present disclosure, there is provided a wireless power receiver that includes an inductive reception unit having a first capacitor, and configured to receive wireless power by an induction scheme; and a resonant reception unit, having a second capacitor and a coil, the second capacitor and the coil being connected to the first capacitor, and configured to receive wireless power by a resonance scheme using a resonant frequency formed by the first capacitor, the second capacitor and the coil.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
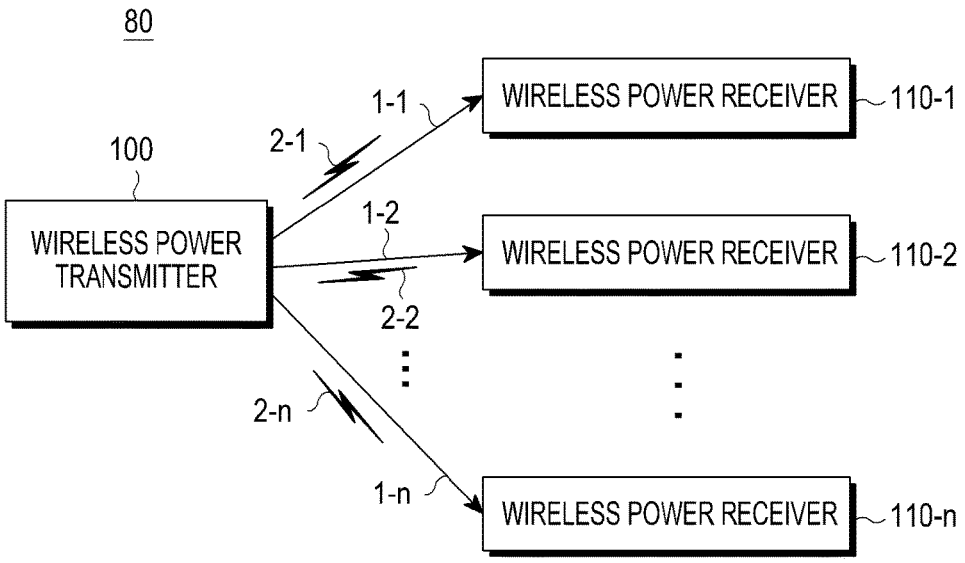
FIG. 1 illustrates overall operations of a wireless charging system.

Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it may be appreciated that the present disclosure is not limited to the presently discussed embodiments. All changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

A wireless power receiver according to various embodiments of the present disclosure may be included in a variety of electronic devices. For example, the electronic device may include at least one of a smartphone, a tablet personal computer (PC), a mobile phone, a video phone, an E-book reader, a desktop PC, a laptop PC, a Netbook computer, a workstation, a server, a personal digital assistant (PDA), a portable multimedia player (PMP), an MP3 player, a mobile medical device, a camera, or a wearable device (e.g., smart glasses, a head mounted device (HMD), electronic clothing, electronic bracelet, electronic necklace, electronic application accessory (or appcessory), electronic tattoo, smart mirror, or smart watch).

First, reference will be made to FIG. 1 which illustrates operations of a wireless charging system 80 that can be applied to an embodiment of the present disclosure.

FIG. 1 illustrates operations of the wireless charging system 80. As shown in FIG. 1, the wireless charging system 80 may include a wireless power transmitter 100 and a plurality of wireless power receivers 110-1, 110-2 . . . 110-n.

The wireless power transmitter 100 may wirelessly transmit power 1-1, 1-2 . . . 1-n to the wireless power receivers 110-1, 110-2 . . . 110-n, respectively.

The wireless power transmitter 100 may form electrical connections with the wireless power receivers 110-1, 110-2 . . . 110-n. For example, the wireless power transmitter 100 may transmit wireless power in the form of an electromagnetic wave to the wireless power receivers 110-1, 110-2 . . . 110-n. The wireless power transmitter 100 may transmit wireless power based on an induction scheme or a resonance scheme.

The wireless power transmitter 100 may perform bidirectional (or two-way) communication with the wireless power receivers 110-1, 110-2 . . . 110-n. The wireless power transmitter 100 and the wireless power receivers 110-1, 110-2 . . . 110-n may process or transmit/receive packets 2-1, 2-2 . . . 2-n configured in a predetermined frame. The wireless power receivers 110-1, 110-2 . . . 110-n may be implemented as mobile communication terminals, PDAs, PMPs, smartphones, and the like.

The wireless power transmitter 100 may wirelessly provide power to a plurality of wireless power receivers 110-1, 110-2 . . . 110-n. For example, the wireless power transmitter 100 may transmit power to the plurality of wireless power receivers 110-1, 110-2 . . . 110-n through the resonance scheme. In a case where the wireless power transmitter 100 adopts the resonance scheme, the plurality of wireless power receivers 110-1, 110-2 . . . 110-n may be charged or operated based on a distance between the wireless power transmitter 100 and the plurality of wireless power receivers 110-1, 110-2 . . . 110-n. In a case where the wireless power transmitter 100 adopts the electromagnetic induction scheme, the plurality of wireless power receivers 110-1, 110-2 . . . 110-n may be charged or operated based on a distance between the wireless power transmitter 100 and the plurality of wireless power receivers 110-1, 110-2 . . . 110-n that is preferably less than or equal to 10 cm.

The wireless power receivers 110-1, 110-2 . . . 110-n may charge the battery via receiving wireless power from the wireless power transmitter 100. Further, the wireless power receivers 110-1, 110-2 . . . 110-n may transmit, to the wireless power transmitter 100, a signal for requesting transmission of wireless power, information for reception of wireless power, status information of the wireless power receiver, or control information for the wireless power transmitter 100.

Further, the wireless power receivers 110-1, 110-2 . . . 110-n may transmit a message indicating its charging status to the wireless power transmitter 100.

The wireless power transmitter 100 may include a display (not shown) to display one or more operating statuses of the wireless power receivers 110-1, 110-2 . . . 110-n based on the message received from the wireless power receivers 110-1, 110-2 . . . 110-n. In addition, the wireless power transmitter 100 may also display a time expected until the wireless power receivers 110-1, 110-2 . . . 110-n are fully charged.

The wireless power transmitter 100 may also transmit a control signal for disabling one or more of the wireless charging of the wireless power receivers 110-1, 110-2 . . . 110-n. Upon receiving a control signal for disabling the wireless charging from the wireless power transmitter 100, one or more of the wireless power receiver 110-1, 110-2 . . . 110-n may disable the wireless charging function.

Figure 2:
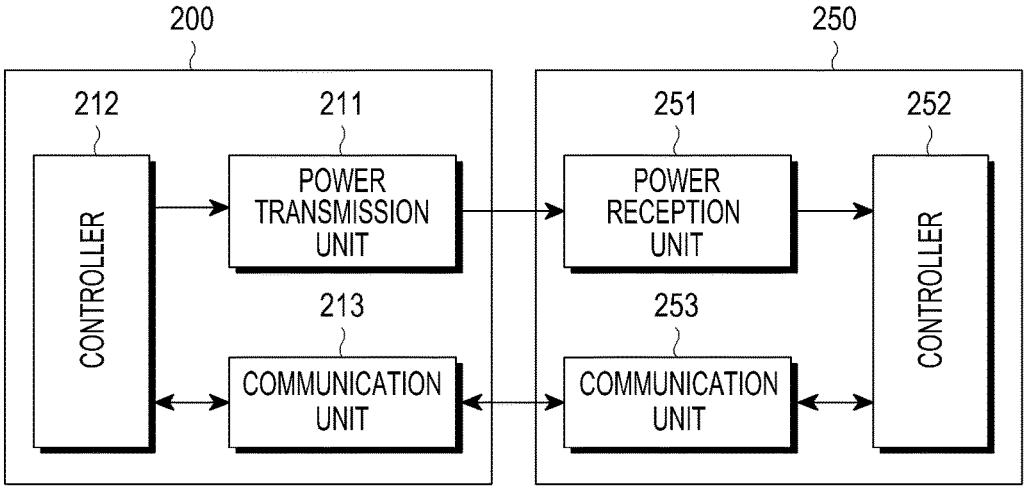
FIG. 2 is a block diagram of a wireless power transmitter and a wireless power receiver according to an embodiment of the present disclosure.

FIG. 2 is a block diagram of a wireless power transmitter 200 and a wireless power receiver 250 according to an embodiment of the present disclosure.

As shown in FIG. 2, the wireless power transmitter 200 may include a power transmission unit 211, a controller 212 and a communication unit 213. The wireless power receiver 250 may include a power reception unit 251, a controller 252 and a communication unit 253.

The power transmission unit 211 may provide the power used by the wireless power transmitter 200, and may wirelessly provide the power to the wireless power receiver 250. The power transmission unit 211 may supply the power in the form of an alternating current (AC), and may also supply the power in the form of a direct current (DC), and convert the DC power into AC power using an inverter (not shown) to supply the power in the form of an AC signal. The power transmission unit 211 may be implemented in the form of a built-in battery, or a power reception interface to receive external power, and to supply the received power to other components. Those skilled in the art will readily understand that the power transmission unit 211 is not limited as long as the power transmission unit 211 is a means capable of providing the power in a predetermined AC signal.

In addition, the power transmission unit 211 may provide AC power to the wireless power receiver 250. The power transmission unit 211 may further include a resonant circuit (not shown) or an inductive circuit (not shown), so the power transmission unit 211 may transmit or receive a predetermined electromagnetic wave. In a case where the power transmission unit 211 is implemented with a resonant circuit, an inductance L of a loop coil (not shown) of the resonant circuit may be changed. Those skilled in the art will readily understand that the power transmission unit 211 is not limited as long as the power transmission unit 211 is capable of transmitting and receiving electromagnetic waves.

The controller 212 may control one or more operations of the wireless power transmitter 200. The controller 212 or the controller 252 may control one or more operations of the wireless power transmitter 200 using the algorithm, program or application from a storage (not shown) and for control.

The controller 212 may be implemented in the form of a central processing unit (CPU), a microprocessor or a mini-computer. The controller 252 may control the overall operation of the wireless power transmitter 200.

The communication unit 213 may communicate with the wireless power receiver 250 in a predetermined manner. The communication unit 213 may communicate with the communication unit 253 of the wireless power receiver 250, using near field communication (NFC), Zigbee communication, infrared communication, visible light communication, Bluetooth communication, a Bluetooth low energy (BLE) scheme, or the like. The communication unit 213 may use a carrier sense multiple access with collision avoidance (CSMA/CA) algorithm. The above-described communication scheme is merely illustrative. Embodiments of the present disclosure correspond to a specific communication scheme performed in the communication unit 213, and the scope thereof is not limited.

The communication unit 213 may transmit a signal for information about the wireless power transmitter 200. The communication unit 213 may unicast, multicast or broadcast the signal.

The communication unit 213 may receive power information from the wireless power receiver 250. The power information may include battery capacity, a remaining battery level, a number of charges, usage, and a battery percentage of the wireless power receiver 250.

The communication unit 213 may transmit a charging function control signal for controlling the charging function of the wireless power receiver 250. The charging function control signal may be a control signal for enabling or disabling the charging function by controlling the power reception unit 251 of the wireless power receiver 250.

In addition to the communication unit 213 receiving a signal from the wireless power receiver 250, and the communication unit 213 may also receive a signal from other wireless power transmitter (not shown). For example, the communication unit 213 may receive a notice signal from another wireless power transmitter.

In FIG. 2, as the power transmission unit 211 and the communication unit 213 are configured as different hardware, the wireless power transmitter 200 appears to communicate in an out-band type, but this is illustrative. In the present disclosure, the power transmission unit 211 and the communication unit 213 may be integrally implemented, so the wireless power transmitter 200 may perform communication in an in-band type.

The wireless power transmitter 200 may exchange various signals with the wireless power receiver 250. Accordingly, the wireless power receiver 250 may subscribe to a charging process offered through a wireless power network managed by the wireless power transmitter 200. Once subscribed, the charging process through wireless power transmission/reception may be performed.

The power reception unit 251 may receive wireless power from the power transmission unit 211 based on the induction scheme or the resonance scheme.

Figure 3A:
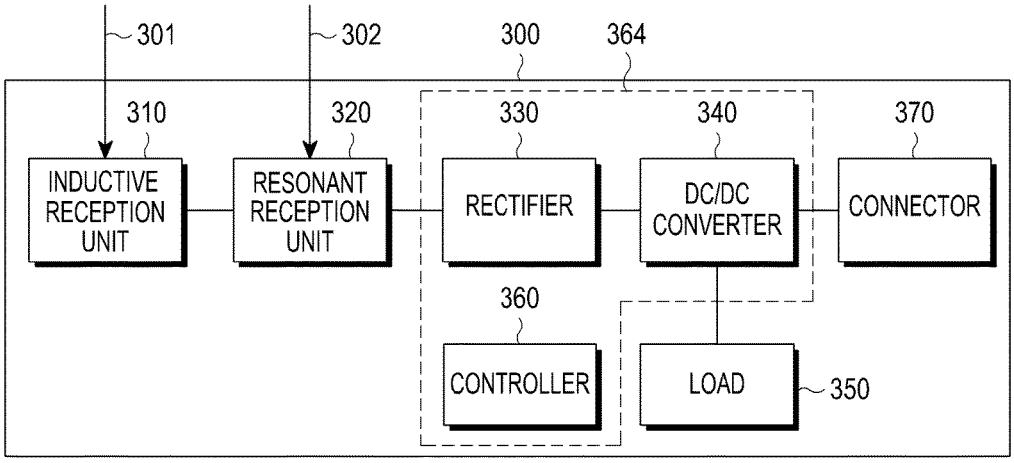
FIGS. 3A and 3B are block diagrams of wireless power receivers according to various embodiments of the present disclosure.

FIG. 3A is a block diagram of a wireless power receiver according to various embodiments of the present disclosure.

A wireless power receiver 300 according to various embodiments of the present disclosure may include an inductive reception unit 310, a resonant reception unit 320, a rectifier 330, a DC/DC converter 340, a load 350, a controller 360 and a connector 370, as shown in FIG. 3A. In various embodiments of the present disclosure, the rectifier 330, the DC/DC converter 340, and the controller 360 may be embodied as a power processing unit 364.

The inductive reception unit 310 may receive wireless power 301 from a wireless power transmitter (e.g., the wireless power transmitter 200 of FIG. 2) based on the induction scheme. In this case, the wireless power transmitter may be designed to transmit wireless power based on the induction scheme. The wireless power transmitter may transmit, for example, wireless power at a first frequency defined in the induction scheme. In the wireless power consortium (WPC) standard, the first frequency may be defined as, for example, 100 kHz. The first frequency may be determined in a range of 100~200 kHz.

The inductive reception unit 310 may receive the wireless power of the first frequency. The inductive reception unit 310 may include at least one capacitor and at least one coil in order to efficiently receive the wireless power at the first frequency. A connection between the at least one capacitor and the at least one coil included in the inductive reception unit 310 will be described in more detail below. The impedance in terms of capacitance and inductance of the at least one capacitor and the at least one coil included in the inductive reception unit 310 may be determined to correspond to the first frequency. Alternatively, the capacitance and the inductance may be determined as defined in the induction scheme. In addition, the inductive reception unit 310 may further include a matching element capable of performing impedance matching. The inductive reception unit 310 may further include a matching element by which the wireless power of the first frequency can be received with high efficiency.

The resonant reception unit 320 may receive wireless power 302 from a wireless power transmitter based on the resonance scheme. In this case, the wireless power transmitter may be designed to transmit wireless power based on the resonance scheme. The wireless power transmitter may transmit, for example, wireless power at a second frequency defined in the resonance scheme. In the Alliance for Wireless Power (A4WP) standard, the second frequency may be defined as, for example, 6.78 MHz.

The resonant reception unit 320 may receive the wireless power at the second frequency. The resonant reception unit 320 may include at least one capacitor and at least one coil in order to efficiently receive the wireless power at the second frequency. A connection between the at least one capacitor and the at least one coil included in the resonant reception unit 320 will be described in more detail below. The impedance in terms of capacitance and inductance of the at least one capacitor and the at least one coil included in the resonant reception unit 320 may be determined to correspond to the second frequency. Alternatively, the capacitance and the inductance may be determined as defined in the resonance scheme. In addition, the resonant reception unit 320 may further include a matching element capable of performing impedance matching. The resonant reception unit 320 may further include a matching element by which the wireless power of the second frequency can be received or delivered with high efficiency.

As shown in FIG. 3A, the inductive reception unit 310 may be directly connected to the resonant reception unit 320. In other words, no switching element may be provided between the inductive reception unit 310 and the resonant reception unit 320. Accordingly, the wireless power receiver 300 may not include any additional switching element between the inductive reception unit 310 and the rectifier 330. In addition, the wireless power receiver 300 may not include any additional switching element between the resonant reception unit 320 and the rectifier 330.

The wireless power 301 of the first frequency received by the inductive reception unit 310 may be delivered to the rectifier 330. In this case, as shown in FIG. 3A, the inductive reception unit 310 and the resonant reception unit 320 may be connected in series, and if the wireless power of the first frequency is received, the wireless power 301 of the first frequency may be delivered to the rectifier 330 without being affected by the resonant reception unit 320. More specifically, the impedance of the resonant reception unit 320 at the first frequency may be much smaller than those of the inductive reception unit 310 and the power processing unit 364. Accordingly, at the first frequency, the resonant reception unit 320 may be construed as a short circuit and the inductive reception unit 310 and the rectifier 330 may be construed to be connected with the short circuit. Accordingly, the wireless power of the first frequency may be delivered from the inductive reception unit 310 to the rectifier 330. If the resonant reception unit 320 according to various embodiments of the present disclosure is connected to the inductive reception unit 310 in series, the resonant reception unit 320 may have impedance smaller than a threshold at the first frequency. Eventually, if wireless charging is performed at the first frequency, a current flowing in the inductive reception unit 310 may have a magnitude that is greater than that of a current flowing in the resonant reception unit 320. For example, a current flowing in a coil of the inductive reception unit 310 may have a magnitude that is greater than that of a current flowing in a resonant circuit of the resonant reception unit 320. As the impedance of the resonant reception unit is very small as discussed above, power consumption caused by the impedance of the resonant reception unit 320 may be ignored.

The resonant reception unit 320 may receive the wireless power 302 at the second frequency. The resonant reception unit 320 may deliver the received wireless power 302 to the rectifier 330.

The rectifier 330 may rectify, into DC power, at least one of the wireless power 301 received from of the inductive reception unit 310 and the wireless power 302 received from the resonant reception unit 320. For example, the rectifier 330 may be implemented in the form of a bridge diode (not shown). The DC/DC converter 340 may convert the rectified power with a predetermined gain. For example, the DC/DC converter 340 may convert the rectified power to an output voltage of about 5V. For a voltage that can be applied to a front end of the DC/DC converter 340, a minimum value and a maximum value may be predetermined. The load 350 may store the converted power received from the DC/DC converter 340.

The controller 360 may control operations of components of the wireless power receiver 300. The controller 360 may be implemented by, for example, a power management integrated chip (PMIC) (not shown), a processor (not shown) or the like. The processor may be one or more of a central processing unit (CPU) (not shown), an application processor (AP) (not shown), or communication processor (CP) (not shown). The processor may, for example, perform operation or data processing related to control and/or communication of at least one other component of the wireless power receiver 300.

The connector 370 may be connected to the DC/DC converter 340. The connector 370 may provide a conduit to receive external power in a wired manner. For example, the connector 370 may be implemented such that terminals for power feeding may be inserted, and the type thereof may not be limited. If power is received from the connector 370 through wires, the DC/DC converter 340 may convert a magnitude of a voltage of the power into a magnitude corresponding to the load 350, and transfer the converted power to the load 350. Depending on implementation, the DC/DC converter 340 may be implemented by a power management integrated circuit (PMIC).

Figure 3B:
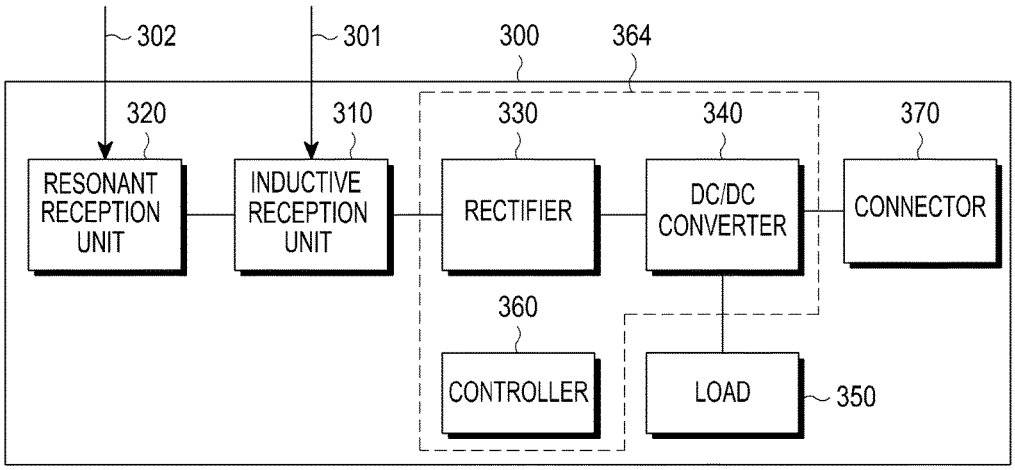

FIG. 3B is a block diagram of a wireless power receiver according to various embodiments of the present disclosure.

As shown in FIG. 3B, the resonant reception unit 320 may be connected to the inductive reception unit 310, and the inductive reception unit 310 may be connected to the rectifier 330. The resonant reception unit 320 may receive the wireless power 302 of the second frequency.

The wireless power 302 at the second frequency, which is received by resonant reception unit 320, may be delivered to the rectifier 330. In this case, as shown in FIG. 3B, the inductive reception unit 310 may be connected in series with the resonant reception unit 320, and if the wireless power at the second frequency is received, the wireless power 302 at the second frequency may be delivered to the rectifier 330 without being affected by the inductive reception unit 310. More specifically, the impedance, at the second frequency, of some elements connected in parallel within the inductive reception unit 310 may much be greater than those of the resonant reception unit 320 and the power processing unit, so the elements may be construed as open circuits and the impedance may be ignored. Accordingly, at the second frequency, some elements of the inductive reception unit 310 may be ignored. Accordingly, the wireless power at the second frequency may be delivered from the resonant reception unit 320 to the rectifier 330.

Eventually, if wireless charging is performed at the second frequency, a current flowing in the resonant reception unit 320 may have a magnitude that is greater than that of a current flowing in the inductive reception unit 310. For example, a current flowing in a resonant circuit of the resonant reception unit 320 may have a magnitude greater than that of a current flowing in a coil of the inductive reception unit 310. A detailed description thereof will be made below.

The inductive reception unit 310 may also receive the wireless power 301 at the first frequency. The inductive reception unit 310 may deliver the received wireless power 301 to the rectifier 330.

As described in FIGS. 3A and 3B, the inductive reception unit 310 may be connected in series with the resonant reception unit 320. In addition, one of the inductive reception unit 310 and the resonant reception unit 320 may be connected to the power processing unit 364. As described above, in a situation where the wireless power 301 at the first frequency is received, the resonant reception unit 320 that is connected in series to the inductive reception unit 310 may be configured as if the resonant reception unit 320 is short circuited. In addition, in a situation where the wireless power 302 of the second frequency is received, an impedance of some elements of the inductive reception unit 310 that is connected in series to the resonant reception unit 320 may be ignored. Accordingly, even in a situation where the wireless power 301 at the first frequency and the wireless power 302 at the second frequency are received, the configuration of the resonant reception unit 320 and the inductive reception unit 310 may not affect the processing of the wireless power. The impedance at the first frequency and the second frequency in a case where the inductive reception unit 310 and the resonant reception unit 320 are connected in series to each other will be described in more detail below.

Figure 4:
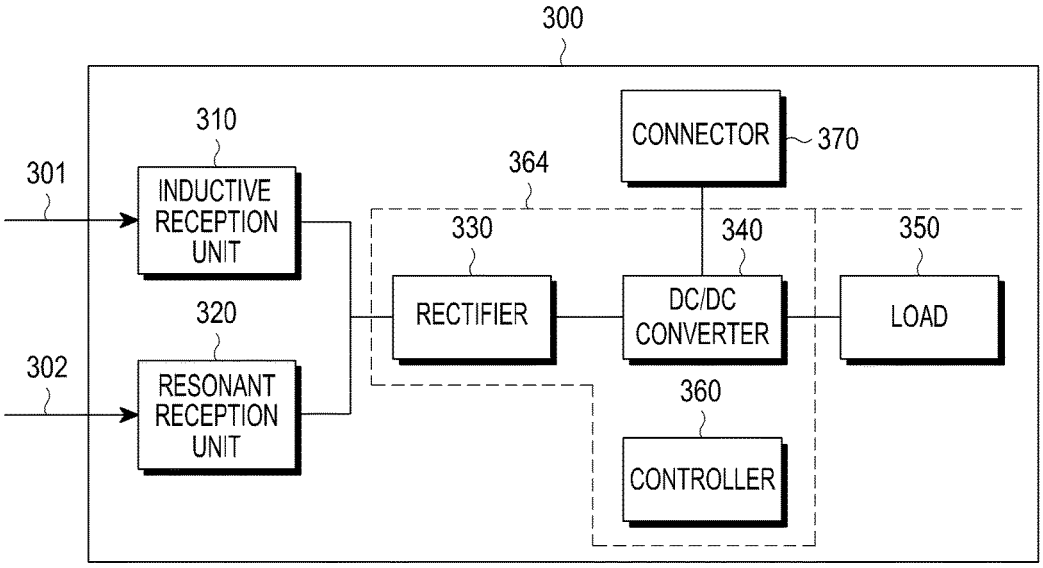
FIG. 4 is a block diagram of a wireless power receiver according to various embodiments of the present disclosure.

FIG. 4 is a block diagram of a wireless power receiver 300 according to various embodiments of the present disclosure.

In particular, in the case of FIG. 4, the inductive reception unit 310 and the resonant reception unit 320 are connected in parallel.

As shown in FIG. 4, the inductive reception unit 310 may be connected to the rectifier 330. The resonant reception unit 320 may also be connected to the rectifier 330. In addition, the inductive reception unit 310 and the resonant reception unit 320 may be connected in parallel.

First, it will be assumed that the wireless power 301 at the first frequency is received. The wireless power 301 at the first frequency may be received at the inductive reception unit 310. The impedance at the first frequency of the resonant reception unit 320 connected in parallel to the inductive reception unit 310 may be much greater than those of the inductive reception unit 310 and the power processing unit 364. Accordingly, at the first frequency, the resonant reception unit 320 connected in parallel to the inductive reception unit 310 may be construed to be opened. The resonant reception unit 320 according to various embodiments of the present disclosure may have the impedance exceeding a threshold at the first frequency, in a case where the resonant reception unit 320 is connected in parallel to the inductive reception unit 310.

Accordingly, the wireless power 301 at the first frequency may be received at the inductive reception unit 310, and then delivered to the rectifier 330. As described above, at the first frequency, the resonant reception unit 320 connected in parallel to the inductive reception unit 310 may be construed to be opened, and the wireless power 301 at the first frequency may be delivered from the inductive reception unit 310 to the rectifier 330 without being affected by the resonant reception unit 320.

Eventually, if wireless charging is performed at the first frequency, a current flowing in the inductive reception unit 310 may have a magnitude that is much greater than that of a current flowing in the resonant reception unit 320. For example, a current flowing in a coil of the inductive reception unit 310 may have a magnitude that is much greater than that of a current flowing in a resonant circuit of the resonant reception unit 320. A detailed description thereof will be made below.

Next, it will be assumed that the wireless power 302 at the second frequency is received. The wireless power 302 at the second frequency may be received at the resonant reception unit 320. The impedance at the second frequency of the inductive reception unit 310 connected in parallel to the resonant reception unit 320 may be much greater than those of the resonant reception unit 320 and the power processing unit. Accordingly, at the second frequency, the inductive reception unit 310 connected in parallel to the resonant reception unit 320 may be construed to be opened. The inductive reception unit 310 according to various embodiments of the present disclosure may have the impedance exceeding a threshold at the second frequency, in a case where the inductive reception unit 310 is connected in parallel to the resonant reception unit 320.

Accordingly, the wireless power 302 at the second frequency may be received at the resonant reception unit 320, and then delivered to the rectifier 330. As described above, at the second frequency, the inductive reception unit 310 connected in parallel to the resonant reception unit 320 may be construed to be opened, and the wireless power 302 at the second frequency may be delivered from the resonant reception unit 320 to the rectifier 330 without being affected by the inductive reception unit 310.

Eventually, if wireless charging is performed at the second frequency, a current flowing in the resonant reception unit 320 may have a magnitude that is much greater than that of a current flowing in the inductive reception unit 310. For example, a current flowing in a resonant circuit of the resonant reception unit 320 may have a magnitude that is much greater than that of a current flowing in a coil of the inductive reception unit 310. A detailed description thereof will be made below.

The impedances of the inductive reception unit 310 and the resonant reception unit 320 connected in parallel at the first frequency and at the second frequency will be described in more detail below.

As described above, the influence of the resonant reception unit 320 at the first frequency and the influence of the inductive reception unit 310 at the second frequency may be blocked, so the wireless power receiver 300 according to an embodiment of the present disclosure may receive the wireless power at both frequencies.

Figure 5:
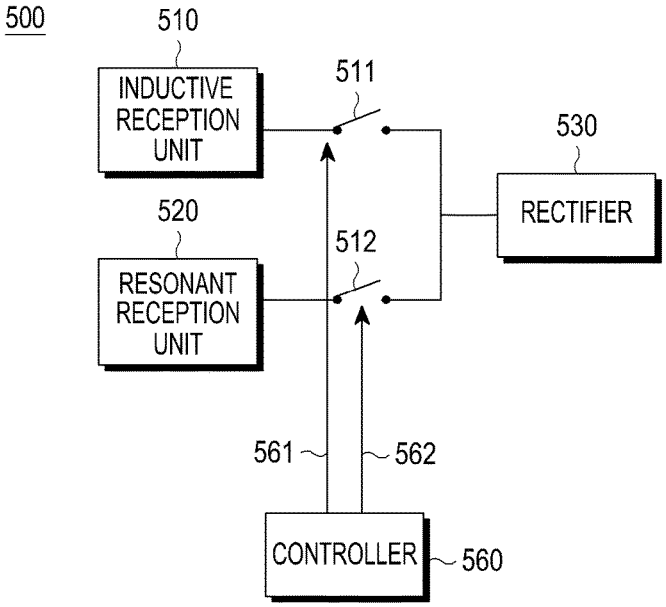
FIG. 5 illustrates a wireless power receiver according to a comparative example for a comparison with the present disclosure.

FIG. 5 illustrates a wireless power receiver 500 (e.g., similar to the wireless power receiver 300 of FIG. 4) according to a comparative example for a comparison with the present disclosure.

As shown in FIG. 5, the wireless power receiver 500 according to a comparative example may include an inductive reception unit 510 and a resonant reception unit 520. The inductive reception unit 510 may be connected to a first switch 511, and the first switch 511 may connect the inductive reception unit 510 to a rectifier 530. The resonant reception unit 520 may be connected to a second switch 512, and the second switch 512 may connect the resonant reception unit 520 to the rectifier 530.

A controller 560 may output or generate switch control signals 561 and 562 for controlling on/off of the first switch 511 and the second switch 512, respectively. For example, if it is determined that the wireless power at the first frequency is received, the controller 560 may output the switch control signal 561 to turn on the first switch 511 for connecting the inductive reception unit 510 to the rectifier 530, while the controller 560 may output the switch control signal 562 to turn off the second switch 512 for disconnecting the inductive reception unit 510 from the rectifier 530. Based on the switch control signals 561 and 562, the first switch 511 may connect the inductive reception unit 510 to the rectifier 530, and the second switch 512 may disconnect the resonant reception unit 520 from the rectifier 530. Accordingly, the wireless power at the first frequency may be received from the inductive reception unit 510, and then delivered to the rectifier 530.

On the other hand, if it is determined that the wireless power at the second frequency is received, the controller 560 may output the switch control signal 561 to turn off the first switch 511 for disconnecting the inductive reception unit 510 from the rectifier 530, while the controller 560 may output the switch control signal 562 to turn on the second switch 512 for connecting the resonant reception unit 520 to the rectifier 530. Based on the switch control signals 561 and 562, the first switch 511 may disconnect the inductive reception unit 510 from the rectifier 530, and the second switch 512 may connect the resonant reception unit 520 to the rectifier 530. Accordingly, the wireless power at the second frequency may be received from the resonant reception unit 520, and then delivered to the rectifier 530.

In other words, the wireless power receiver 500 according to a comparative example may isolate the inductive reception unit 510 from the resonant reception unit 520. That is to say, the wireless power receiver 500 according to a comparative example may isolate the resonant reception unit 520 from the inductive reception unit 510 upon receiving the wireless power at the first frequency, and may isolate the inductive reception unit 510 from the resonant reception unit 520 upon receiving the wireless power at the second frequency. Accordingly, the wireless power receiver 500 according to a comparative example may include elements for isolation (e.g., the first switch 511 and the second switch 512), unlike the wireless power receiver 300 according to various embodiments of the present disclosure. In addition, the wireless power receiver 500 according to a comparative example may also include a control program for isolation (e.g., a timing control program for controlling the switch control signals 561 and 562), unlike the wireless power receiver 300 according to various embodiments of the present disclosure. The wireless power receivers 300, according to various embodiments of the present disclosure, which have been described in FIGS. 3A, 3B and 4, may not include elements for isolation or a control program for isolation of the wireless power receiver according to a comparative example, thereby facilitating a reduction in mounting area, simplification of the control program, and a reduction in resources for running the control program.

Figure 6:
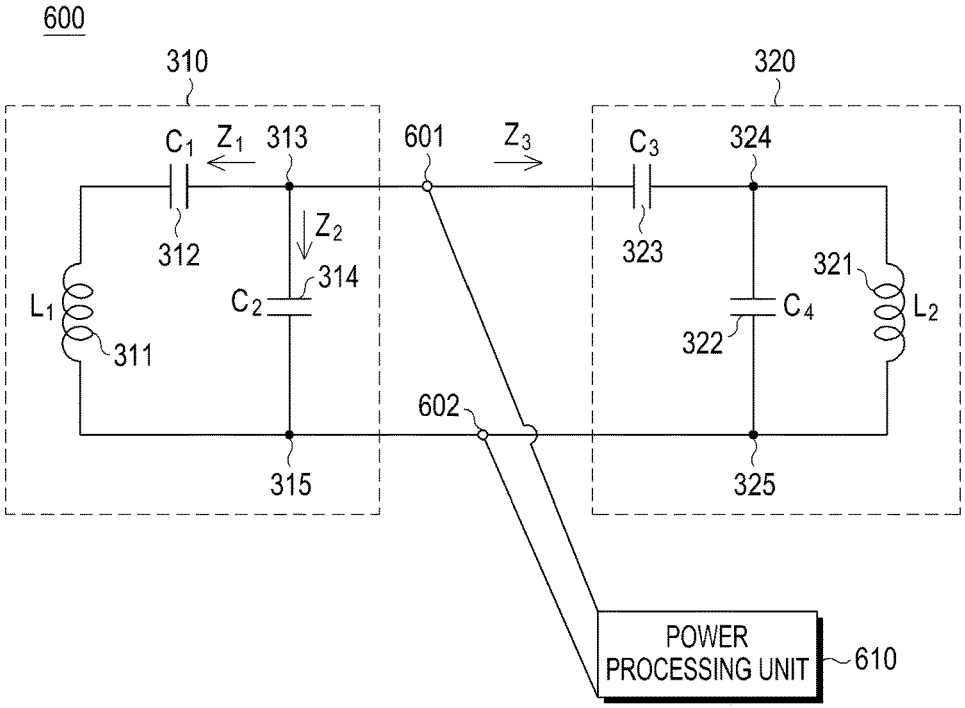
FIG. 6 illustrates a circuit diagram of a wireless power receiver according to various embodiments of the present disclosure.

FIG. 6 illustrates a circuit diagram of a wireless power receiver 600 according to various embodiments of the present disclosure.

As shown in FIG. 6, the inductive reception unit 310 may include a first coil 311, a first capacitor 312 and a second capacitor 314. The resonant reception unit 320 may include a second coil 321, a third capacitor 323 and a fourth capacitor 322. The inductive reception unit 310 according to an embodiment of FIG. 6 may be connected to a first node 601 and a second node 602, and the first node 601 and the second node 602 may be connected to a power processing unit 610 (e.g., similar the power processing unit 364 of FIGS. 3A, 3B, and 4). The resonant reception unit 320 according to an embodiment of FIG. 6 may be connected to the first node 601 and the second node 602, and the first node 601 and the second node 602 may be connected to the power processing unit 610. In other words, the inductive reception unit 310 and the resonant reception unit 320 may be connected in parallel.

One end of the first coil 311 may be connected to a fourth node 315. The other end of the first coil 311 may be connected to one end of the first capacitor 312. The other end of the first capacitor 312 may be connected to a third node 313. The third node 313 may be connected to the first node 601. One end of the second capacitor 314 may be connected to the third node 313. The other end of the second capacitor 314 may be connected to the fourth node 315. The fourth node 315 may be connected to the second node 602. The first coil 311 may have an inductance $L_1$, and the first capacitor 312 may have a capacitance $C_1$. The second capacitor 314 may have a capacitance $C_2$.

One end of the second coil 321 may be connected to a fifth node 324, to which one end of the third capacitor 323 and one end of the fourth capacitor 322 may be connected. The other end of the fourth capacitor 322 may be connected to a sixth node 325, to which the other end of the second coil 321 and the second node 602 may be connected. The other end of the third capacitor 323 may be connected to the first node 601. The second coil 321 may have an inductance $L_2$, and the third capacitor 323 may have a capacitance $C_3$. The fourth capacitor 322 may have a capacitance $C_4$.

The impedances of the inductive reception unit 310 and the resonant reception unit 320 in view of the power processing unit 610 may be as shown in EQN. (1).

$$Z_{total}=Z_1\|Z_2\|Z_3 \qquad \text{EQN. (1)}$$

$Z_1$ may represent impedance for the first coil 311 and the first capacitor 312 as shown in FIG. 6. At an angular frequency ω, $Z_1$ may be $$j\omega L_1+\frac{1}{j\omega C_1},\ \text{i.e.,}\ \frac{(j\omega)^2L_1C_1+1}{j\omega C_1}.$$

$Z_2$ may represent impedance for the second capacitor 314 as shown in FIG. 6. At an angular frequency ω, $Z_2$ may be $$\frac{1}{j\omega C_1}.$$

$Z_3$ may represent impedance for the second coil 321, the third capacitor 323 and the fourth capacitor 322 as shown in FIG. 6. At an angular frequency ω, $Z_3$ may be $$\frac{1}{j\omega C_3}+\left[(j\omega L_2)\left\|\left(\frac{1}{j\omega C_4}\right)\right.\right],\ \text{i.e.,}\ \frac{1+(j\omega)^2L_2(C_3+C_4)}{j\omega C_3\left(1+(j\omega)^2L_2C_4\right)}.$$

Table I shows impedances $Z_1$, $Z_2$, and $Z_3$, at the first frequency and the second frequency.

TABLE I

| | First frequency (e.g., 100 kHz) | Second frequency (e.g., 6.78 MHz) |
|---|---|---|
| $Z_1$ | $\frac{(j\omega)^2L_1C_1+1}{j\omega C_1}$ | $j\omega L_1$ since $(j\omega)^2L_1C_1 >> 1$ |
| $Z_2$ | $\frac{1}{j\omega C_1}$ | $\frac{1}{j\omega C_2}$ |
| $Z_3$ | $\frac{1}{j\omega C_3}$ since $(j\omega)^2L_2(C_3+C_4)<<1$ | $\frac{1+(j\omega)^2L_2(C_3+C_4)}{j\omega C_3(1+(j\omega)^2L_2C_4)}$ |

First, it will be assumed that the first frequency is 100 kHz. In this case, w may be $6.28\times10^5$ rad/s, $L_1$ may be 10 μH, $L_2$ may be 500 nH, $C_1$ may be 300 nF, $C_2$ may be 1 nF, $C_3$ may be 1 nF, and $C_4$ may be 500 pF.

In this case, $Z_1$ may be j11.6, $Z_2$ may be −j1592, and $Z_3$ may be −j1592. In other words, it may be determined that $Z_1$ is dominant in the wireless power receiver 600 at the first frequency (i.e., 100 kHz). More specifically, since the inductive reception unit 310 and the resonant reception unit 320 are connected in parallel, the resonant reception unit 320 corresponding to $Z_3$ having much greater impedance may be relatively insignificant in terms of its influence on the wireless power receiver 600. Accordingly, the resonant reception unit 320 may be construed to be ignored, and the inductive reception unit 310 may receive the wireless power at the first frequency and deliver the received wireless power to the power processing unit 610 at the first frequency.

Eventually, if wireless charging is performed at the first frequency, a current flowing in the inductive reception unit 310 may have a magnitude that is much greater than that of a current flowing in the resonant reception unit 320. A current flowing in the first coil 311 of the inductive reception unit 310 may have a magnitude that is much greater than that of a current flowing in the resonant reception unit 320 formed with the second coil 321, the fourth capacitor 322 and the third capacitor 323 of the resonant reception unit 320. More specifically, a current output from the first coil 311 may flow through three paths in a $Z_2$ direction, a $Z_3$ direction and a direction of the power processing unit 610. As described above, impedances in the $Z_2$ direction and the $Z_3$ direction may have a relatively large value, and most of the current may flow towards the power processing unit 610 having an impedance of a relatively small value. For example, an impedance of the power processing unit 610 may have a value of 10Ω. In addition, a current that is induced at the first coil 311 of the inductive reception unit 310 by a magnetic field from the primary coil of the wireless power transmitter may have a magnitude that is much greater than that of a current that is induced at the second coil 321 of the resonant reception unit 320. This is because as the wireless power transmitter and the inductive reception unit 310 are impedance-matched, the intensity of the reflected wave of the magnetic field is small. Since the resonant reception unit 320 are not designed to be impedance-matched with the wireless power transmitter using induction scheme, a current that is induced at the second coil 321 of the resonant reception unit 320 by a magnetic field from the primary coil of the wireless power transmitter may have a magnitude that is smaller than that of a current that is induced at the first coil 311 of the inductive reception unit 310. This is because the intensity of the reflected wave, at which the magnetic field from the primary coil of the wireless power transmitter is reflected by the resonant reception unit 320, is relatively greater than that reflected wave at the inductive reception unit 310. As described above, the wireless power receiver according to various embodiments of the present disclosure may be designed so that the inductive reception unit 310 may be impedance-matched with the wireless power transmitter employing the induction scheme, and may be designed so that the resonant reception unit 320 is not impedance-matched with the wireless power transmitter employing the induction scheme.

Next, it will be assumed that the second frequency is 6.78 MHz. In this case, w may be $4.26\times10^7$ rad/s, $L_1$ may be 10 μH, $L_2$ may be 500 nH, $C_1$ may be 300 nF, $C_2$ may be 1 nF, $C_3$ may be 1 nF, and $C_4$ may be 500 pF.

In this case, $Z_1$ may be j426, $Z_2$ may be −j23.5, and $Z_3$ may be j15.4. In other words, it may be determined that $Z_2$ and $Z_3$ are dominant in the wireless power receiver 600 at the second frequency (i.e., 6.78 MHz). More specifically, since the inductive reception unit 310 and the resonant reception unit 320 are connected in parallel, the first coil 311 and the first capacitor 312 of the inductive reception unit 310 corresponding to $Z_1$ having much greater impedance may be relatively insignificant in terms of their influences on the wireless power receiver 600. Accordingly, the first coil 311 and the first capacitor 312 may be construed to be ignored, and the resonant reception unit 320 and the second capacitor 314 may receive the wireless power of the second frequency and deliver the received wireless power to the power processing unit 610 at the second frequency.

Accordingly, the wireless power receiver 600 according to various embodiments of the present disclosure may be designed to have a resonant circuit in which the second coil 321, the third capacitor 323, the fourth capacitor 322 and the second capacitor 314 have a resonant frequency of 6.78 MHz alone or together with other elements.

Eventually, if wireless charging is performed at the second frequency, a current flowing in the resonant reception unit 320 may have a magnitude that is much greater than that of a current flowing in the inductive reception unit 310. For example, a current flowing in the resonant circuit formed with the second coil 321, the fourth capacitor 322 and the third capacitor 323 of the resonant reception unit 320 may have a magnitude that is much greater than that of a current flowing in the first coil 311 of the inductive reception unit 310.

More specifically, a current output from the first coil 311 may flow through three paths in a $Z_1$ direction, a $Z_2$ direction and a direction of the power processing unit 610. As described above, impedances in the $Z_1$ direction and the $Z_2$ direction may have a relatively large value, and most of the current may flow towards the power processing unit 610 having an impedance of a relatively small value. For example, an impedance of the power processing unit 610 may have a value of 10Ω. In addition, most of the current that is generated in the power reception unit 251 by an electromagnetic field transmitted from a resonant circuit of the wireless power transmitter may be generated in the resonant circuit of the resonant reception unit 320. This is because the resonant circuit of the wireless power transmitter and the resonant circuit of the resonant reception unit 320 have substantially the same or the same resonant frequency. Although the inductive reception unit 310 may also have the resonant circuit, since the resonant circuit of the inductive reception unit 310 has a resonant frequency different from the resonant frequency of the wireless power transmitter, a current that is generated in the inductive reception unit 310 by an electromagnetic field transmitted from the resonant circuit of the wireless power transmitter may have a magnitude that is smaller than that of a current that is generated in the resonant circuit of the resonant reception unit 320.

In various embodiments of the present disclosure, the second capacitor 314 may be referred to as a shared capacitor, since the second capacitor 314 is used in the inductive reception unit 310 and also in the resonant reception unit 320.

Figure 7:
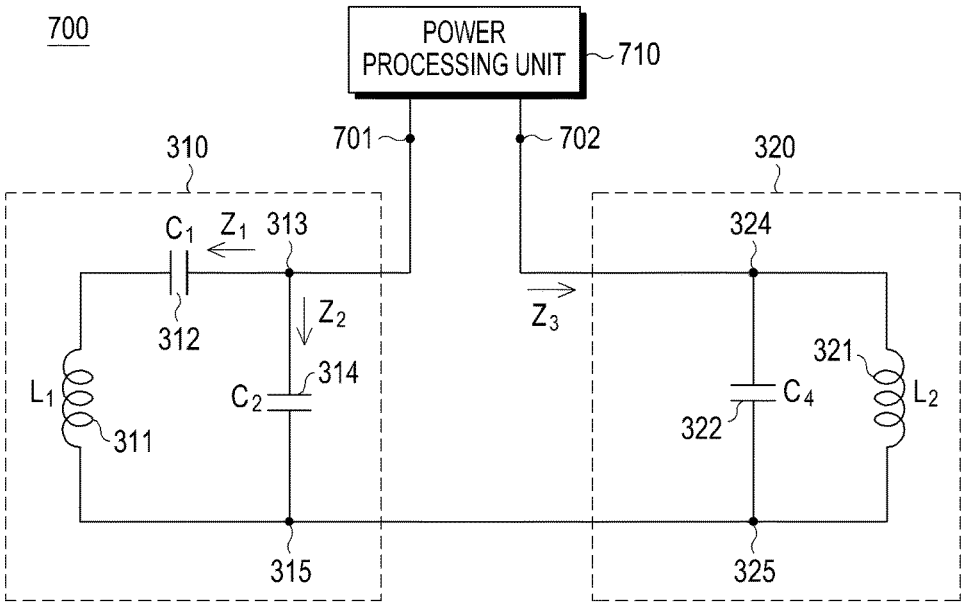
FIG. 7 illustrates a circuit diagram of a wireless power receiver according to various embodiments of the present disclosure.

FIG. 7 illustrates a circuit diagram of a wireless power receiver 700 according to various embodiments of the present disclosure.

In the embodiment of FIG. 7, the inductive reception unit 310 may be connected in series with the resonant reception unit 320.

As shown in FIG. 7, the inductive reception unit 310 may include a first coil 311, a first capacitor 312 and a second capacitor 314. The resonant reception unit 320 may include a second coil 321 and a fourth capacitor 322. The resonant reception unit 320 may not include the third capacitor 323, unlike the resonant reception unit 320 in the embodiment of FIG. 6.

The inductive reception unit 310 according to an embodiment of FIG. 7 may be connected to a first node 701, and the resonant reception unit 320 may be connected to a second node 702. The first node 701 and the second node 702 may be connected to a power processing unit 710.

One end of the first coil 311 may be connected to the fourth node 315. The other end of the first coil 311 may be connected to one end of the first capacitor 312. The other end of the first capacitor 312 may be connected to the third node 313. The third node 313 may be connected to the first node 701. One end of the second capacitor 314 may be connected to the third node 313. The other end of the second capacitor 314 may be connected to the fourth node 315. The fourth node 315 may be connected to a sixth node 325. The first coil 311 may have an inductance $L_1$, and the first capacitor 312 may have a capacitance $C_1$. The second capacitor 314 may have a capacitance $C_2$.

One end of the second coil 321 may be connected to the fifth node 324, to which one end of the fourth capacitor 322 may be connected. The other end of the fourth capacitor 322 may be connected to the sixth node 325, to which the other end of the second coil 321 and the fourth node 315 may be connected. The second coil 321 may have an inductance $L_2$, and the fourth capacitor 322 may have a capacitance $C_4$.

The impedances of the inductive reception unit 310 and the resonant reception unit 320 in view of the power processing unit 710 may be as shown in EQN. (2).

$$Z_{total}=(Z_1\|Z_2)+Z_3 \quad \text{EQN. (2)}$$

$Z_1$ may represent impedance for the first coil 311 and the first capacitor 312 as shown in FIG. 7. At an angular frequency ω, $Z_1$ may be $$j\omega L_1+\frac{1}{j\omega C_1}, \text{ i.e., } \frac{(j\omega)^2L_1C_1+1}{j\omega C_1}.$$

$Z_2$ may represent impedance for the second capacitor 314 as shown in FIG. 7. At an angular frequency ω, $Z_2$ may be $$\frac{1}{j\omega C_2}.$$

$Z_3$ may represent impedance for the second coil 321 and the fourth capacitor 322 as shown in FIG. 7. At an angular frequency ω, $Z_3$ may be $$(j\omega L_2)\left\|\frac{1}{j\omega C_4}\right., \text{ i.e., } \frac{j\omega L_2}{1+(j\omega)^2L_2C_4}.$$

Table II shows impedances $Z_1$, $Z_2$, and $Z_3$ at the first frequency and the second frequency.

TABLE II

| | First frequency (e.g., 100 kHz) | Second frequency (e.g., 6.78 MHz) |
|---|---|---|
| $Z_1$ | $\frac{(j\omega)^2L_1C_1+1}{j\omega C_1}$ | $j\omega L_1$ since $(j\omega)^2L_1C_1 >> 1$ |
| $Z_2$ | $\frac{1}{j\omega C_2}$ | $\frac{1}{j\omega C_2}$ |
| $Z_3$ | $j\omega L_2$ since $(j\omega)^2L_2C_4 << 1$ | $\frac{j\omega L_2}{1+(j\omega)^2L_2C_4}$ |

First, it will be assumed that the first frequency is 100 kHz. In this case, w may be $6.28\times10^5$ rad/s, $L_1$ may be 10 μH, $L_2$ may be 500 nH, $C_1$ may be 300 nF, $C_2$ may be 1 nF, and $C_4$ may be 500 pF.

In this case, $Z_1$ may be j11.6, $Z_2$ may be −j1592, and $Z_3$ may be j0.314. In other words, in the environment of the first frequency (i.e., 100 kHz), it may be determined that $(Z_1\|Z_2)$ is dominant in the wireless power receiver. More specifically, since the inductive reception unit 310 is connected in series with the resonant reception unit 320, the resonant reception unit 320 corresponding to $Z_3$ having smaller impedance may be relatively insignificant in terms of its influence on the wireless power receiver. Accordingly, in the environment of the first frequency, the resonant reception unit 320 may have negligible impedance (e.g., short-circuited), and the inductive reception unit 310 may receive the wireless power of the first frequency and deliver the received wireless power to the power processing unit 710. In other words, since the power consumed in the resonant reception unit 320 is relatively insignificant, most of the power from the inductive reception unit 310 may be delivered to the power processing unit 710 without being consumed.

Eventually, if wireless charging is performed at the first frequency, a current flowing in the inductive reception unit 310 may have a magnitude that is much greater than that of a current flowing in the resonant reception unit 320. As described above, when power is received by the induction scheme, the intensity of the current output from the second coil 321 of the resonant reception unit 320 may be relatively smaller than that of the current output from the first coil 311.

Next, it will be assumed that the second frequency is 6.78 MHz. In this case, w may be $4.26\times10^7$ rad/s, $L_1$ may be 10 μH, $L_2$ may be 500 nH, $C_1$ may be 300 nF, $C_2$ may be 1 nF, and $C_4$ may be 500 pF.

In this case, $Z_1$ may be j426, $Z_2$ may be −j23.5, and $Z_3$ may be j38.9. In other words, it may be determined that $Z_2$ and $Z_3$ are dominant in the wireless power receiver 700 at the second frequency (i.e., 6.78 MHz). More specifically, since $Z_1$ is connected in parallel with $Z_2$, the influence of $Z_1$ having much greater impedance may be relatively insignificant. Accordingly, the first coil 311 and the first capacitor 312 may have very large impedances (e.g., opened), and the resonant reception unit 320 and the second capacitor 314 may receive the wireless power at the second frequency and deliver the received wireless power to the power processing unit 710 at the second frequency. In other words, since the power consumption by the first coil 311 and the first capacitor 312 can be relatively insignificant, most of the power from the resonant reception unit 320 may be delivered to the power processing unit 710.

Accordingly, the wireless power receiver 700 according to various embodiments of the present disclosure may be designed to have a resonant circuit in which the second coil 321, the fourth capacitor 322 and the second capacitor 314 have a resonant frequency of 6.78 MHz alone or together with other elements.

Eventually, if wireless charging is performed at the second frequency, a current flowing in the resonant reception unit 320 may have a magnitude that is greater than that of a current flowing in the inductive reception unit 310. As described above, since the resonant reception unit 320 has substantially the same or the same frequency as that of the wireless power transmitter employing the resonance scheme, most of the current by electromagnetic waves transmitted from the wireless power transmitter at the second frequency may be generated in the resonant reception unit 320.

In various embodiments of the present disclosure, the second capacitor 314 may be referred to as a shared capacitor, since the second capacitor 314 is used in the inductive reception unit 310 and also in the resonant reception unit 320.

FIGS. 8A through 8K illustrate arrangements of a coil for an induction scheme and a coil for a resonance scheme according to various embodiments of the present disclosure.

Figure 8A:
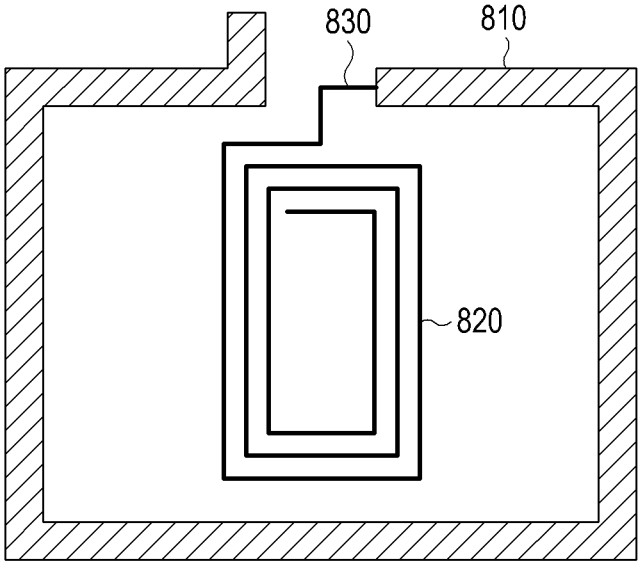
FIGS. 8A through 8K illustrate arrangements of a coil for an induction scheme and a coil for a resonance scheme according to various embodiments of the present disclosure.

Referring to FIG. 8A, a coil 820 for the induction scheme may be disposed inside a coil 810 for the resonance scheme. The example that the coil 820 for the induction scheme is disposed inside the coil 810 for the resonance scheme is merely illustrative. The coil 810 for the resonance scheme may be disposed inside the coil 820 for the induction scheme. In the embodiment of FIG. 8A, the coil 820 for the induction scheme may be disposed in the relative center of the coil 810 for the resonance scheme.

The coil 810 for the resonance scheme and the coil 820 for the induction scheme may be connected in series with connection 830. In another embodiment, the coil 810 for the resonance scheme and the coil 820 for the induction scheme may further include their matching circuits. The coil 810 for the resonance scheme and the coil 820 for the induction scheme may be connected in series, with a matching circuit interposed therebetween.

As described above, the coil 810 for the resonance scheme and the coil 820 for the induction scheme may be formed on one printed circuit board (PCB).

Figure 8B:
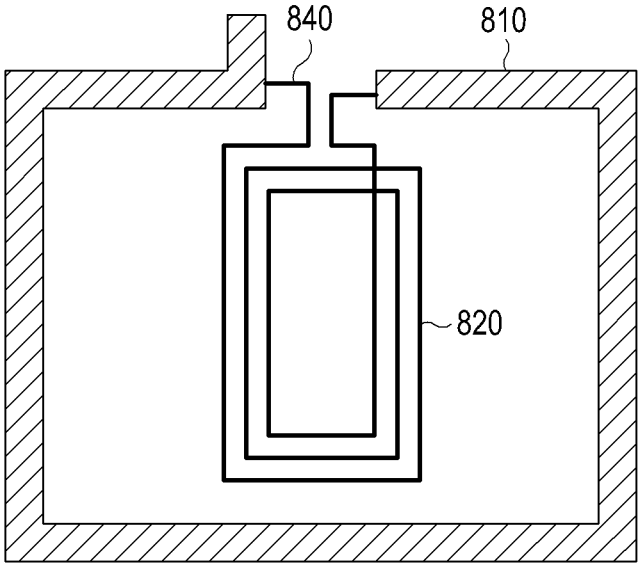

Referring to FIG. 8B, the coil 820 for the induction scheme may be disposed inside the coil 810 for the resonance scheme. The coil 810 for the resonance scheme and the coil 820 for the induction scheme may be connected in parallel as shown by connection 840. In another embodiment, the coil 810 for the resonance scheme and the coil 820 for the induction scheme may further include their matching circuits. The coil 810 for the resonance scheme and the coil 820 for the induction scheme may be connected in parallel, with a matching circuit interposed therebetween. In addition, an additional capacitor may be further included between the coil 810 for the resonance scheme and the coil 820 for the induction scheme as shown in, for example, FIG. 6.

Figure 8C:
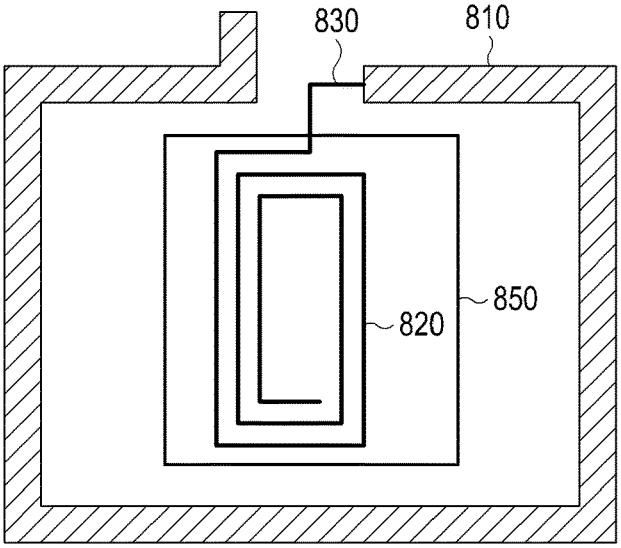

Referring to FIG. 8C, the coil 820 for the induction scheme may be disposed inside the coil 810 for the resonance scheme. A communication antenna 850 may be additionally formed inside the coil 810 for the resonance scheme. An electronic device (not shown) with a wireless power receiver may communicate with another electronic device (not shown) via the communication antenna 850. In some embodiments, the communication antenna 850 is based on a variety of communication schemes such as, for example, NFC, Bluetooth, BLE, and Zigbee. In the embodiment of FIG. 8C, the communication antenna 850 may be disposed in the relative center of the coil 810 for the resonance scheme.

As described above, the communication antenna 850 may also be formed on a PCB, thus reducing a corresponding mounting area.

Figure 8D:
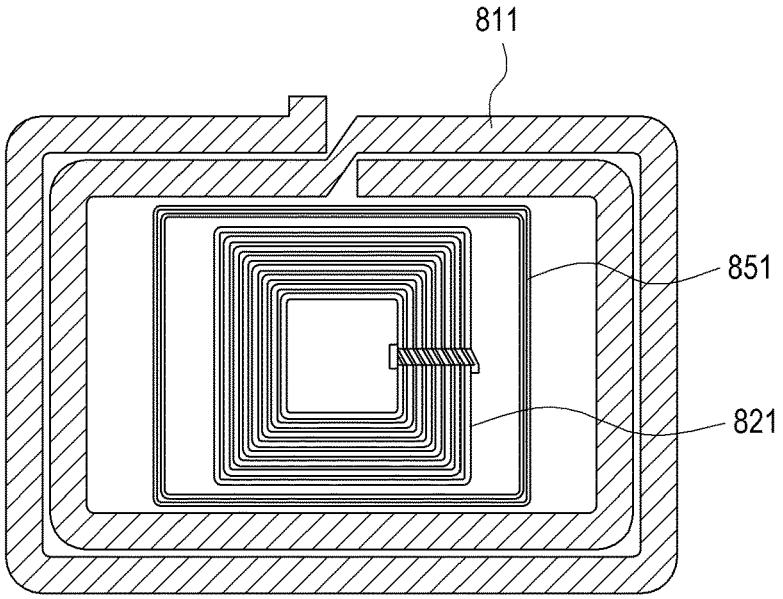
Figure 8E:
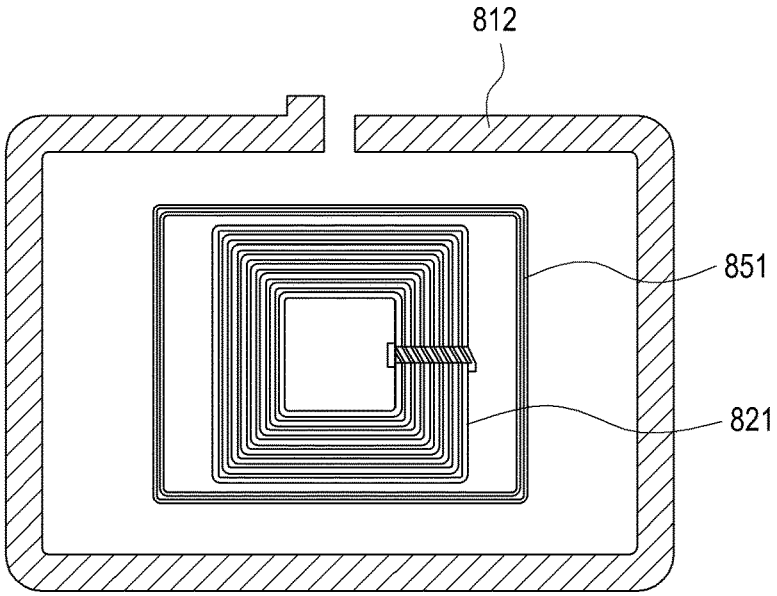
Figure 8F:
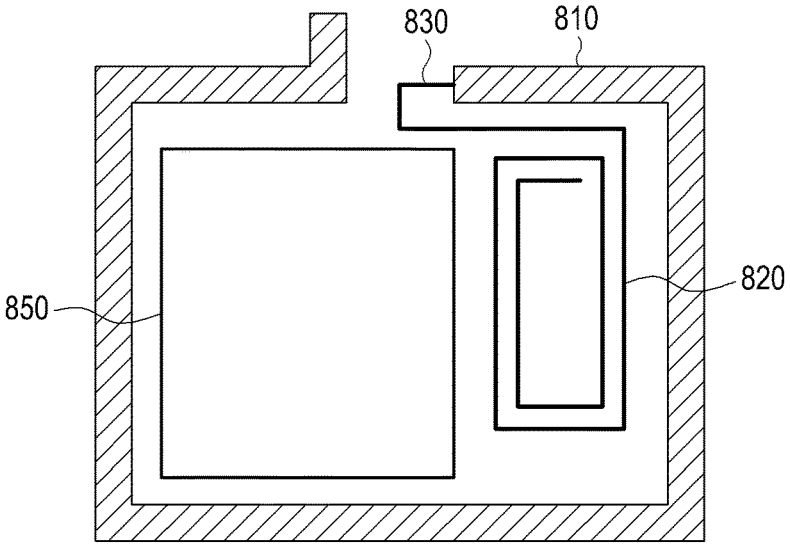
Figure 8G:
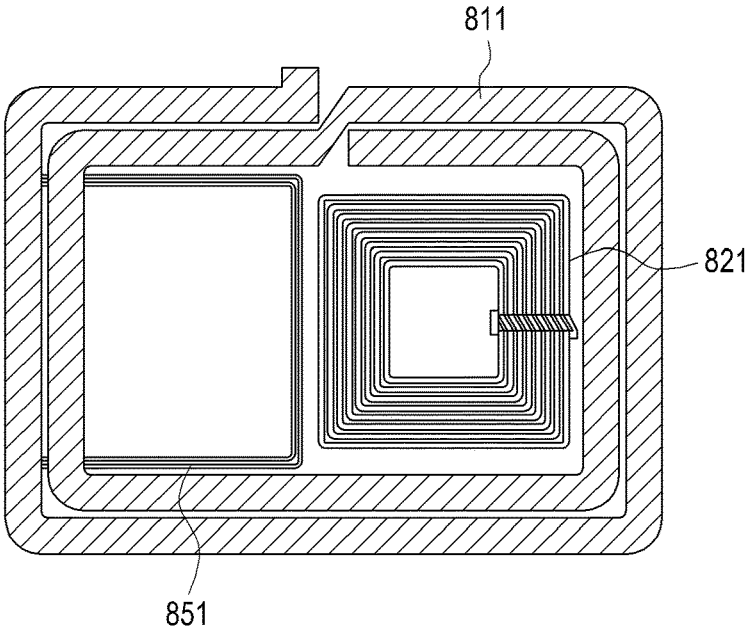

FIG. 8D illustrates an implementation according to various embodiments of the present disclosure. As shown in FIG. 8D, a coil 811 for the resonance scheme may a continuous loop that winds around a plurality of times. In addition, a coil 821 for the induction scheme may also have a continuous loop that winds around a plurality of times. In the embodiment of FIG. 8D, an NFC antenna 851 may be disposed outside the coil 821 for the induction scheme and inside the coil 811 for the resonance scheme. FIG. 8E illustrates an implementation according to various embodiments of the present disclosure. A coil 812 for the resonance scheme may have a continuous loop that winds around once. Referring to FIG. 8F, the coil 820 for the induction scheme may be disposed inside the coil 810 for the resonance scheme. The coil 820 for the induction scheme may be disposed on the relatively right side of the coil 810 for the resonance scheme. In addition, the communication antenna 850 for the induction scheme may be disposed on the relatively left side of the coil 810 for the resonance scheme. FIG. 8G illustrates an implementation according to various embodiments of the present disclosure, and the coil 811 for the resonance scheme may have a continuous a loop that winds around a plurality of times. In addition, the coil 821 for the induction scheme may also have a continuous loop that winds a plurality of times. In the embodiment of FIG. 8G, the NFC antenna 851 may be disposed on the relatively left side of the inside of the coil 811 for the resonance scheme, and the coil 821 for the induction scheme may be disposed on the relatively right side of the inside of the coil 811 for the resonance scheme.

Figure 8H:
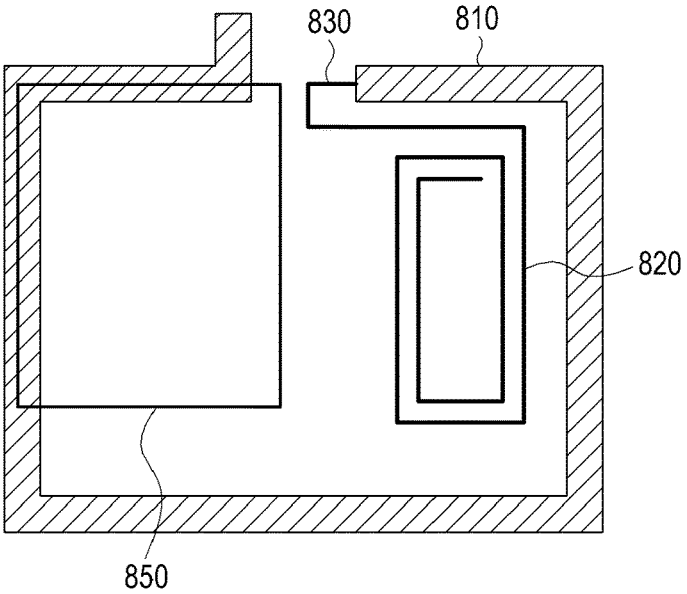
Figure 8I:
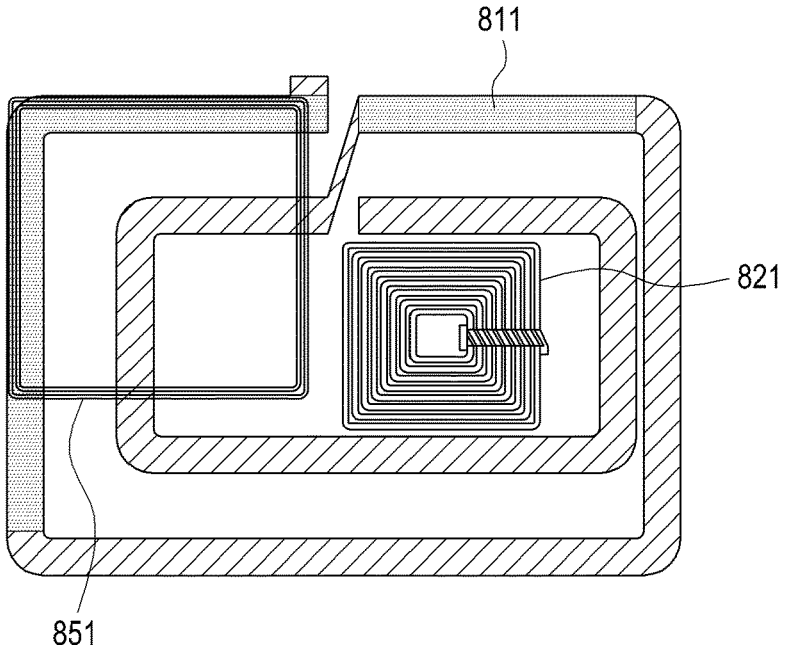

Referring to FIG. 8H, the coil 820 for the induction scheme may be disposed inside the coil 810 for the resonance scheme. The coil 820 for the induction scheme may be disposed on the relatively right side of the coil 810 for the resonance scheme. In addition, the communication antenna 850 for the induction scheme may be disposed on the relatively left side of the coil 810 for the resonance scheme. A part of the communication antenna 850 may overlap with a part of the coil 810 for the resonance scheme. FIG. 8I illustrates an implementation according to various embodiments of the present disclosure, and the coil 811 for the resonance scheme may have a continuous loop that winds around a plurality of times. In addition, the coil 821 for the induction scheme may also have a continuous loop that winds around a plurality of times. In the embodiment of FIG. 8I, a part of the NFC antenna 851 may overlap with a part of the coil 811 for the resonance scheme.

Figure 8J:
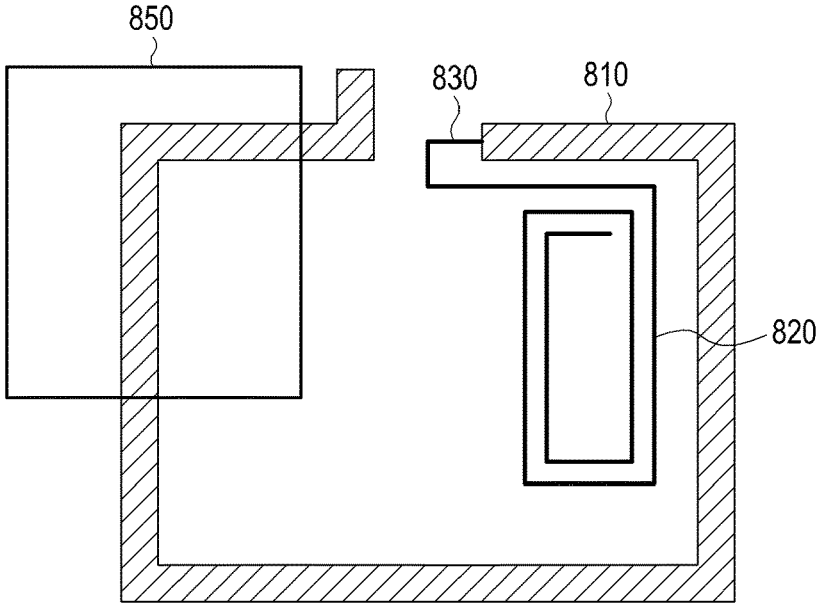
Figure 8K:
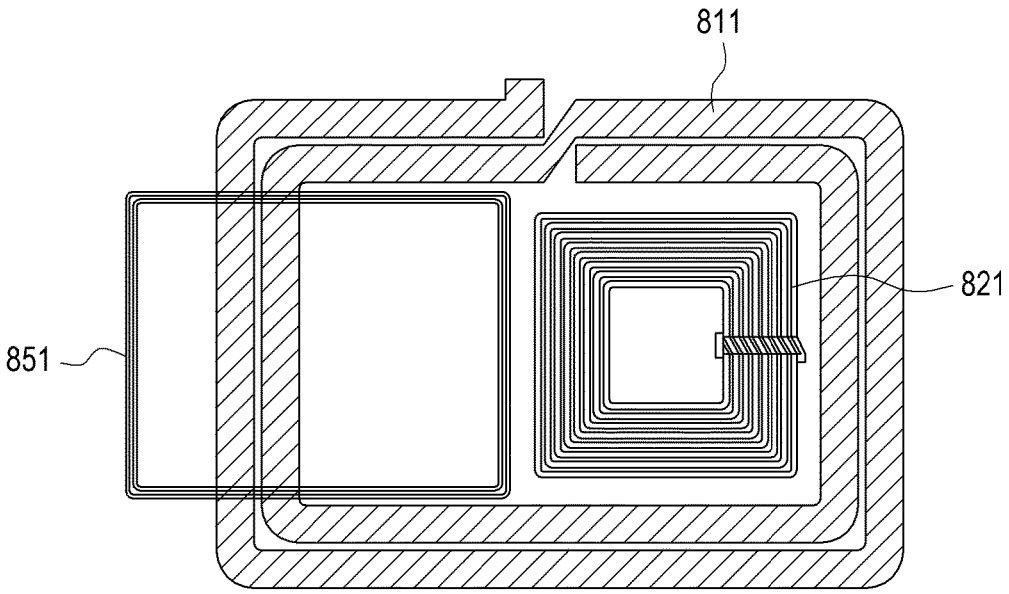

Referring to FIG. 8J, the coil 820 for the induction scheme may be disposed inside the coil 810 for the resonance scheme. The coil 820 for the induction scheme may be disposed on the relatively right side of the coil 810 for the resonance scheme. In addition, the communication antenna 850 for the induction scheme may be disposed on the relatively left side of the coil 810 for the resonance scheme. A part of the communication antenna 850 may be placed outside the coil 810 for the resonance scheme. FIG. 8K illustrates an implementation according to various embodiments of the present disclosure, and the coil 811 for the resonance scheme may have a continuous loop that winds around a plurality of times. In addition, the coil 821 for the induction scheme may also have a continuous loop that winds around a plurality of times. In the embodiment of FIG. 8K, a part of the NFC antenna 851 may be disposed outside the coil 811 for the resonance scheme.

Figure 9A:
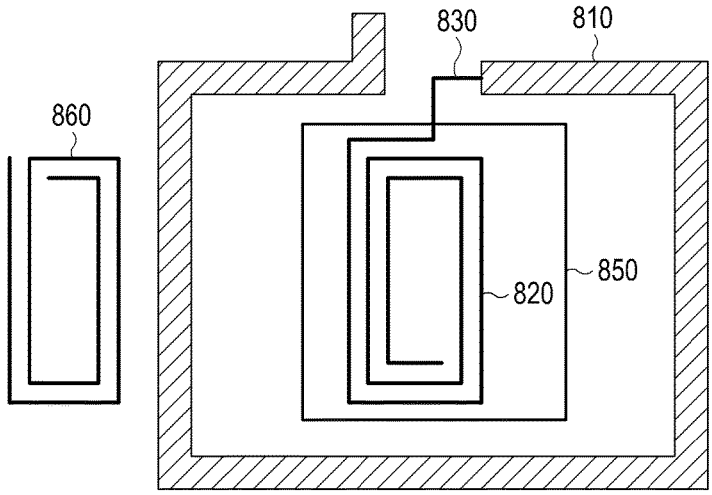
FIGS. 9A and 9B illustrate respective arrangements of a coil for an induction scheme and a coil for a resonance scheme according to various embodiments of the present disclosure.
Figure 9B:
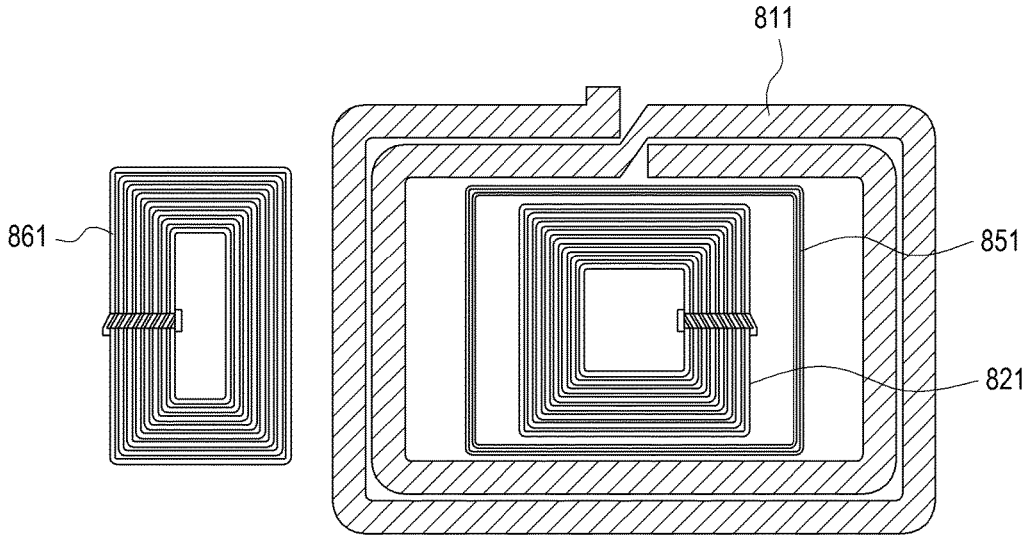

FIGS. 9A and 9B illustrate arrangements of a coil for an induction scheme and a coil for a resonance scheme according to various embodiments of the present disclosure.

FIG. 9A illustrates an implementation according to various embodiments of the present disclosure, and the coil 820 for the induction scheme may be disposed inside the coil 810 for the resonance scheme. The communication antenna 850 may be additionally formed inside the coil 810 for the resonance scheme. In the embodiment of FIG. 9A, the communication antenna 850 may be disposed in the relative center of the coil 810 for the resonance scheme. A magnetic secure transmission (MST) antenna, or MST antenna 860, may be placed outside the coil 810 for the resonance scheme. FIG. 9B illustrates an implementation according to various embodiments of the present disclosure, and the coil 811 for the resonance scheme may have a continuous loop that winds around a plurality of times. In addition, the coil 821 for the induction scheme may also have a continuous loop that winds around a plurality of times. In the embodiment of FIG. 9B, the NFC antenna 851 may be disposed outside the coil 821 for the induction scheme and inside the coil 811 for the resonance scheme. An MST antenna 860 may be placed outside the coil 811 for the resonance scheme. The MST antenna 860 may also be formed on one PCB, thus reducing a corresponding mounting area.

Figure 10:
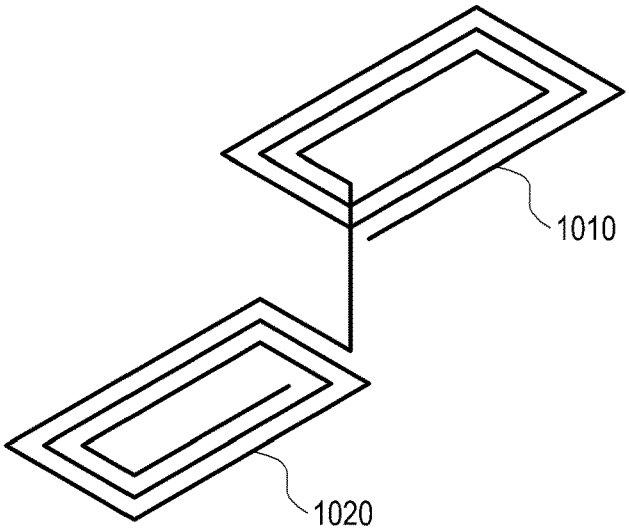
FIG. 10 illustrates a configuration of coils according to various embodiments of the present disclosure.

FIG. 10 illustrates a configuration of coils according to various embodiments of the present disclosure.

For example, a coil for the induction scheme or a coil used as an MST antenna may generally have a relatively greater inductance of several μH or more, and a relatively smaller resistance of 1Ω or less. In order to have a relatively greater inductance and/or a small resistance, the area occupied by the coil for the induction scheme or the coil used as an MST antenna may increase, causing an increase in the mounting area. The coil according to various embodiments of the present disclosure may be composed of 2-layer sub coils 1010 and 1020 as shown in FIG. 10, for a decrease in a corresponding occupied area and an increase in the inductance. The above-described 2-layer structure is merely illustrative. The coil according to various embodiments of the present disclosure may include a plurality of sub coils, and the plurality of sub coils may be disposed in different layers.

Figure 11:
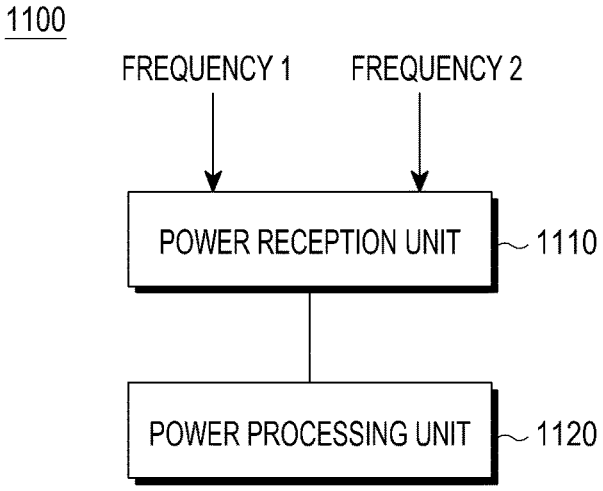
FIG. 11 is a block diagram of a wireless power receiver according to various embodiments of the present disclosure.

FIG. 11 is a block diagram of a wireless power receiver 1100 according to various embodiments of the present disclosure.

As shown in FIG. 11, the wireless power receiver 1100 may include a power reception unit 1110 and a power processing unit 1120.

The power reception unit 1110 may receive wireless power at a first frequency by an induction scheme and deliver the received wireless power to the power processing unit 1120. The power reception unit 1110 may receive wireless power at a second frequency by a resonance scheme and deliver the received wireless power to the power processing unit 1120. In other words, the power reception unit 1110 may receive the wireless power based on both the induction scheme and the resonance scheme.

The power processing unit 1120 may process the wireless power at the first frequency or the wireless power at the second frequency, which is provided from the power reception unit 1110. For example, the power processing unit 1120 may include at least one of a rectifier (e.g., similar to the rectifier 330 of FIG. 3A), a DC/DC converter (e.g., similar to the DC/DC converter 340 of FIG. 3A), and a load (e.g., similar to the load 350 of FIG. 3A).

Figure 12:
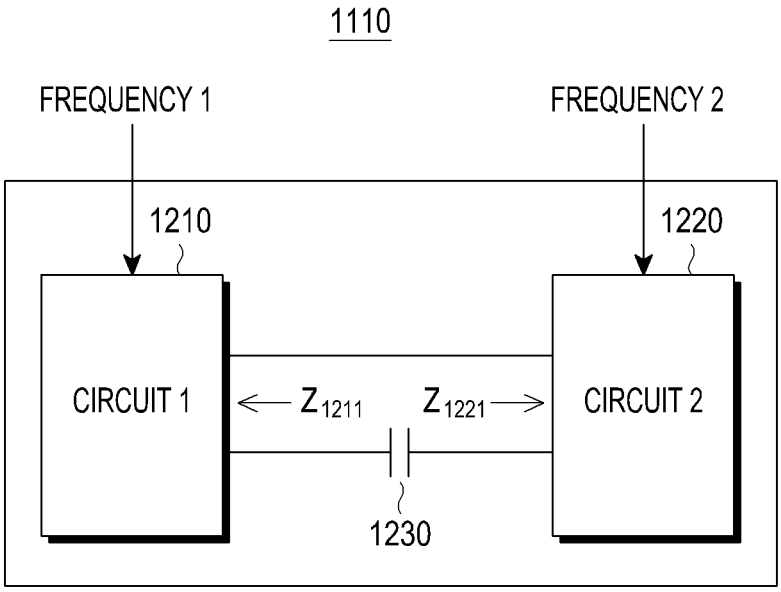
FIG. 12 is a block diagram of a power reception unit according to various embodiments of the present disclosure.

FIG. 12 is a block diagram of the power reception unit 1110 of FIG. 11 according to various embodiments of the present disclosure.

As shown in FIG. 12, the power reception unit 1110 may include a first circuit 1210 and a second circuit 1220. The first circuit 1210 may include, for example, at least one coil and at least one capacitor. The coil of the first circuit 1210 is a coil for the induction scheme, and may be for receiving wireless power at the first frequency. The second circuit 1220 may include, for example, at least one coil and at least one capacitor. The coil of the second circuit 1220 is a coil for the resonance scheme, and may be for receiving wireless power at the second frequency.

Impedance $Z_{1211}$ of the first circuit 1210 may much exceed a threshold at the second frequency, so the first circuit 1210 may be construed to be opened in parallel connection. In addition, impedance $Z_{1221}$ of the second circuit 1220 may exceed a threshold at the first frequency, so the second circuit 1220 may be construed to be opened in parallel connection.

The power reception unit 1110 may further include a shared capacitor 1230.

The first circuit 1210 and the shared capacitor 1230 may receive wireless power of the first frequency by the induction scheme. At the first frequency, the second circuit 1220 may be construed to be opened, and the first circuit 1210 and the shared capacitor 1230 may receive the wireless power of the first frequency and deliver the received wireless power to the power processing unit 1120.

The second circuit 1220 and the shared capacitor 1230 may form a resonant circuit. A resonant frequency of the resonant circuit may be set as, for example, the second frequency. At the second frequency, the first circuit 1210 may be construed to be opened, and the second circuit 1220 and the shared capacitor 1230 may receive the wireless power of the second frequency and deliver the received wireless power to the power processing unit 1120.

According to various embodiments of the present disclosure, a wireless power receiver configured to receive wireless power may include a resonant reception unit configured to receive wireless power by a resonance scheme; an inductive reception unit configured to receive wireless power by an induction scheme; and a power processing unit configured to process wireless power received at the resonant reception unit and the inductive reception unit. When wireless power is received by the induction scheme, a current flowing in the inductive reception unit is greater than a current flowing in the resonant reception unit, and when wireless power is received by the resonance scheme, a current flowing in the resonant reception unit is greater than a current flowing in the inductive reception unit.

According to various embodiments of the present disclosure, the resonant reception unit and the inductive reception unit may be connected in parallel.

According to various embodiments of the present disclosure, the inductive reception unit may include a first coil having a first end and a second end, and the first end being connected to the power processing unit; a first capacitor having a first end and a second end, with the first end being connected to the second end of the first coil; and a second capacitor having a first end and a second end, with the first end being connected to the first end of the first coil, and with the second end being connected to the second end of the first coil. According to various embodiments of the present disclosure, the resonant reception unit may include a second coil having a first end and a second end; a third capacitor with a first end connected to the first end of the second coil, and with a second end connected to the second end of the first capacitor; and a fourth capacitor having a first end and a second end, with the first end being connected to the second end of the second coil, and with the second end connected to the second end of the second coil, the first end of the first coil, and the second end of the second capacitor.

According to various embodiments of the present disclosure, the second capacitor, the third capacitor, the fourth capacitor and the second coil may constitute a resonant circuit. A resonant frequency of the resonant circuit may be a frequency that is defined in the resonance scheme.

According to various embodiments of the present disclosure, at a frequency defined in the resonance scheme, an impedance of the first coil and the first capacitor in view of the power processing unit may exceed a threshold. At a frequency defined in the induction scheme, an impedance of the second coil, the third capacitor and the fourth capacitor in view of the power processing unit may exceed a threshold.

According to various embodiments of the present disclosure, the first coil and the second coil may be formed on one PCB, and the first coil may be formed on the inside of the second coil. In addition, an antenna may be further formed on the PCB.

According to various embodiments of the present disclosure, the resonant reception unit and the inductive reception unit may be connected in series.

According to various embodiments of the present disclosure, the inductive reception unit may include a first coil having a first end and a second end, with the first end being connected to the power processing unit; a first capacitor with a first end connected to the second end of the first coil; and a second capacitor having a first end and a second end, with the first end being connected to the first end of the first coil, and with the second end connected to the second end of the first coil. The resonant reception unit may include a second coil having a first end and a second end; and a fourth capacitor having a first end and a second end, with the first end being connected to the first end of the second coil, and with the second end being connected to the second end of the second coil, the first end of the first coil, and the second end of the second capacitor.

According to various embodiments of the present disclosure, the second capacitor, the fourth capacitor and the second coil may constitute a resonant circuit. A resonant frequency of the resonant circuit may be a frequency that is defined in the resonance scheme.

According to various embodiments of the present disclosure, at a frequency defined in the resonance scheme, an impedance of the first coil and the first capacitor in view of the power processing unit may exceed a threshold.

According to various embodiments of the present disclosure, at a frequency defined in the induction scheme, an impedance of the second coil and the fourth capacitor in view of the power processing unit may be less than a second threshold different from the threshold.

According to various embodiments of the present disclosure, the power processing unit may include at least one of a rectifier configured to rectify wireless power in a form of an alternating current (AC) from at least one of the inductive reception unit and the resonant reception unit, into wireless power in a form of a direct current (DC); a DC/DC converter configured to convert the wireless power rectified by the rectifier with a predetermined gain; and a load configured to store the wireless power converted by the DC/DC converter.

According to various embodiments of the present disclosure, a wireless power receiver may include a power reception unit configured to receive wireless power of a first frequency by an induction scheme, and receive wireless power of a second frequency by a resonance scheme; and a power processing unit configured to process the wireless power of the first frequency and the wireless power of the second frequency.

According to various embodiments of the present disclosure, the power reception unit may include a shared capacitor used for both the induction scheme and the resonance scheme; a first circuit configured to receive the wireless power of the first frequency by the induction scheme, with the shared capacitor; and a second circuit configured to receive the wireless power of the second frequency by the resonance scheme, with the shared capacitor.

According to various embodiments of the present disclosure, at the second frequency, an impedance of the first circuit may exceed a threshold in view of the power processing unit. At the first frequency, an impedance of the second circuit may exceed a threshold in view of the power processing unit.

According to various embodiments of the present disclosure, the first circuit and the shared capacitor may constitute a resonant circuit, and the resonant circuit may have a resonant frequency defined in the resonance scheme.

According to various embodiments of the present disclosure, a wireless power receiver may include an inductive reception unit having a first capacitor, and configured to receive wireless power by an induction scheme; and a resonant reception unit, having a second capacitor and a coil, the second capacitor and the coil being connected to the first capacitor, and configured to receive wireless power by a resonance scheme using a resonant frequency formed by the first capacitor, the second capacitor and the coil.

According to various embodiments of the present disclosure, a wireless power receiver for receiving wireless power may include a resonant circuit configured to receive wireless power by a resonance scheme; a coil configured to receive wireless power by an induction scheme; and a power processing unit configured to process wireless power received through the resonant circuit and the coil. When wireless power is received by the induction scheme, a current flowing in the coil is greater than a current flowing in the resonant circuit, and when wireless power is received by the resonance scheme, a current flowing in the resonant circuit is greater than a current flowing in the coil.

Each of above-described components of the wireless power receiver may be configured with one or more components, the names of which may vary depending on the type of the wireless power receiver. In various embodiments, the wireless power receiver may include at least one of the above-described components, some of which may be omitted, or may further include additional other components. Further, some of the components of the wireless power receiver according to various embodiments of the present disclosure may be configured as one entity by being combined, thereby performing the previous functions of the components in the same manner.

The term 'unit' as used herein may refer to a unit that includes, for example, one or a combination of hardware, software or firmware. The term 'unit' may be interchangeably used with terms such as, for example, module, logic, logical block, component, or circuit. The unit may be the minimum unit of an integrally constructed part or a part thereof. The unit may be the minimum unit for performing one or more functions, or a part thereof. The unit may be implemented mechanically or electronically. For example, the module may include at least one of an application-specific integrated circuit (ASIC) chip, field-programmable gate arrays (FPGAs), or a programmable-logic device, which are known or will be developed in the future, and which perform certain operations.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic way. Some operations may be performed in a different order or omitted, or other operations may be added.

As is apparent from the foregoing description, an aspect of various embodiments of the present disclosure may provide a wireless power receiver capable of receiving wireless power based on both of the induction scheme by electromagnetic induction and the resonance scheme by electromagnetic resonance. Another aspect of various embodiments of the present disclosure may provide a wireless power receiver capable of receiving wireless power from both of the induction scheme-based wireless power transmitter and the resonance scheme-based wireless power transmitter. Therefore, it is possible to provide a wireless power receiver capable of charging its battery in various wireless charging environments regardless of the wireless charging environment.

In the wireless power receiver according to various embodiments of the present disclosure, a circuit for the induction scheme and a circuit for the resonance scheme may be directly connected to each other. Accordingly, the wireless power receiver according to various embodiments of the present disclosure may not require the additional switches and switch control algorithm for selecting one of the resonance scheme and the induction scheme.

Embodiments disclosed herein have been presented for the description and understanding of the disclosed technical details, and are not intended to limit the scope of the present disclosure. Therefore, the scope of the present disclosure should be construed to include all modifications or various other embodiments based on the technical concept of the present disclosure.

What is claimed is:

1. A wireless power receiver configured to receive wireless power, the wireless power receiver comprising:

*a first reception unit configured to receive wireless power by a first power transmission scheme based on a magnetic field at a first frequency;* a [resonant] *second* reception unit configured to receive wireless power by a [resonance] *second power transmission* scheme *based on a magnetic field* at a second frequency;

[an inductive reception unit configured to receive wireless power by an induction scheme at a first frequency;] and a power processing [unit] *circuit* configured to process wireless power received at the [resonant] *first* reception unit and the [inductive] *second* reception unit;

wherein when the wireless power is received by the [induction] *first power transmission* scheme, a current flowing in the [inductive] *first* reception unit is greater than a current flowing in the [resonant] *second* reception unit, and when the wireless power is received by the [resonance] *second power transmission* scheme, a current flowing in the [resonant] *second* reception unit is greater than a current flowing in the [inductive] *first* reception unit, wherein the [resonant] *first reception unit comprises a first circuit comprising at least one first coil and at least one first capacitor, and the second* reception unit comprises a second circuit comprising at least one second coil [an] *and* at least one [fourth] *second* capacitor[, the inductive reception unit comprises a first circuit comprising at least one first coil and at least one first capacitor], and wherein *a first end of* the first circuit *is connected to a first end of the power processing circuit and a first end of the second circuit, and a second end of the first circuit is connected to a second end of* the second circuit[, and] *and a second end of* the power processing [unit are connected in parallel] *circuit*.

2. The wireless power receiver of claim 1, wherein *the first reception unit and* the [resonant] *second* reception unit [and the inductive reception unit] are connected in parallel.

3. The wireless power receiver of claim 2, wherein the [inductive] *first* reception unit comprises:

the first coil having a first end and a second end, and the first end of the first coil being connected to the power processing [unit] *circuit*;

the first capacitor having a first end and a second end, with the first end of the first capacitor being connected to the second end of the first coil; and a [second] *third* capacitor having a first end and a second end, with the first end of the [second] *third* capacitor being connected to the first end of the first coil, and with the second end of the [second] *third* capacitor being connected to the second end of the first capacitor; and wherein the [resonant] *second* reception unit comprises:

the second coil having a first end and a second end;

[a third] *the second* capacitor with a first end of the [third] *second* capacitor connected to the first end of the second coil, and with a second end of the [third] *second* capacitor connected to the second end of the first capacitor; and

[the] *a* fourth capacitor having a first end and a second end, with the first end of the fourth capacitor being connected to the second end of the second coil, and with the second end of the fourth capacitor connected to the second end of the second coil, the first end of the first coil, and the second end of the [third] *second* capacitor.

4. The wireless power receiver of claim 3, wherein the second capacitor, the third capacitor, the fourth capacitor and the second coil constitute [a resonant] *the second* circuit.

5. The wireless power receiver of claim 3, wherein at the second frequency defined in the [resonance] *second power transmission* scheme, an impedance of the first coil and the first capacitor in view of the power processing [unit] *circuit* exceeds a threshold.

6. The wireless power receiver of claim 3, wherein at the first [frequenc] *frequency*, an impedance of the second coil, the [third] *second* capacitor and the fourth capacitor in view of the power processing [unit] *circuit* exceeds a threshold.

7. The wireless power receiver of claim 3, wherein the first coil and the second coil are formed on one printed circuit board (PCB), and the first coil is formed on an inside of the second coil.

8. The wireless power receiver of claim 7, further comprising an antenna formed on the PCB.

[9. The wireless power receiver of claim 1, where the resonant reception unit and the inductive reception unit are connected in series.]

[10. The wireless power receiver of claim 9, wherein the inductive reception unit comprises:

the first coil having a first end and a second end, with the first end being connected to the power processing unit;

the first capacitor with a first end connected to the second end of the first coil; and a second capacitor having a first end and a second end, with the first end being connected to the first end of the first coil, and with the second end connected to the second end of the first capacitor; and wherein the resonant reception unit comprises:

the second coil having a first end and a second end; and the fourth capacitor having a first end and a second end, with the first end being connected to the first end of the second coil, and with the second end being connected to the second end of the second coil, the first end of the first coil, and the second end of the second capacitor.]

[11. The wireless power receiver of claim 10, wherein the second capacitor, the fourth capacitor and the second coil constitute a resonant circuit.]

[12. The wireless power receiver of claim 10, wherein at the second frequency, an impedance of the first coil and the first capacitor in view of the power processing unit exceeds a first threshold.]

[13. The wireless power receiver of claim 12, wherein at the first frequency, an impedance of the second coil and the fourth capacitor in view of the power processing unit is less than a second threshold different from the first threshold.]

14. The wireless power receiver of claim 1, wherein the power processing [unit] *circuit* comprises at least one of:

a rectifier configured to rectify wireless power in a form of an alternating current (AC) from at least one of the [inductive] *first* reception unit and the [resonant] *second* reception unit, into wireless power in a form of a direct current (DC);

a DC/DC converter configured to convert the wireless power rectified by the rectifier with a predetermined gain; and a load configured to store the wireless power converted by the DC/DC converter.

15. The wireless power receiver of claim 1, wherein the [inductive] *first* reception unit is directly connected to the [resonant] *second* reception unit.

16. A wireless power receiver for receiving wireless power, comprising:

[a resonant circuit configured to receive wireless power by a resonance scheme at a second frequency;]

a coil configured to receive wireless power by [an induction] *a first power transmission* scheme *based on a magnetic field* at a first frequency; [and]

*a first circuit configured to receive wireless power by a second power transmission scheme based on a magnetic field at a second frequency; and* a power processing [unit] *circuit* configured to process wireless power received through the [resonant] *first* circuit and the coil;

wherein when the wireless power is received by the [induction] *first power transmission* scheme, a current flowing in the coil is greater than a current flowing in the [resonant] *first* circuit, and when the wireless power is received by the [resonance] *second power transmission* scheme, a current flowing in the [resonant] *first* circuit is greater than a current flowing in the coil, wherein *a first end of* the [resonant] *first* circuit *is connected to a first end of the coil and a first end of the power processing circuit*, [the coil, and the power processing unit are connected in parallel] *and a second end of the first circuit is connected to a second end of the coil and a second end of the power processing circuit*.

17. A wireless power receiver comprising:

a power reception unit configured to receive wireless power of a first frequency by [an induction] *a first power transmission* scheme *based on a magnetic field*, and receive wireless power of a second frequency by a [resonance] *second power transmission* scheme; and a power processing [unit] *circuit* configured to process the wireless power of the first frequency *range* and the wireless power of the second frequency, wherein the power reception unit comprises:

a shared capacitor used for both the [induction] *first power transmission* scheme and the [resonance] *second power transmission* scheme;

a first circuit configured to receive the wireless power of the first frequency *range* by the [induction] *first power transmission* scheme, with the shared capacitor; and a second circuit configured to receive the wireless power of the second frequency by the [resonance] *second power transmission* scheme, with the shared capacitor, wherein *a first end of* the first circuit[,] *is connected to a first end of* the second circuit[, and] *and a first end of* the power processing [unit are connected in parallel] *circuit, and a second end of the first circuit is connected to a second end of the second circuit and a second end of the power processing circuit*.

18. The wireless power receiver of claim 17, wherein at the second frequency, an impedance of the first circuit exceeds a threshold in view of the power processing [unit] *circuit*.

19. The wireless power receiver of claim 17, wherein at the first frequency, an impedance of the second circuit exceeds a threshold in view of the power processing [unit] *circuit*.

* * * * *